(12) United States Patent
Sislow et al.

(10) Patent No.: US 11,556,667 B2
(45) Date of Patent: Jan. 17, 2023

(54) FACILITATING PROCESSING OF A QUERY ON SHAREABLE DATA IN A TEMPORARY VAULT

(71) Applicant: Sympatic, Inc., Chicago, IL (US)

(72) Inventors: Joseph Sislow, Evanston, IL (US); Piers Nash, Chicago, IL (US)

(73) Assignee: Sympatic, Inc., Chicago, IL (US)

( * ) Notice: Subject to any disclaimer, the term of this patent is extended or adjusted under 35 U.S.C. 154(b) by 226 days.

(21) Appl. No.: 16/947,884

(22) Filed: Aug. 21, 2020

(65) Prior Publication Data

US 2021/0056225 A1 Feb. 25, 2021

Related U.S. Application Data

(60) Provisional application No. 62/890,861, filed on Aug. 23, 2019.

(51) Int. Cl.
| | |
|---|---|
| *G06F 21/62* | (2013.01) |
| *G06Q 30/04* | (2012.01) |
| *G06F 21/44* | (2013.01) |
| *G06F 21/64* | (2013.01) |
| *G06F 21/31* | (2013.01) |

(52) U.S. Cl.
CPC .......... *G06F 21/6227* (2013.01); *G06F 21/31* (2013.01); *G06F 21/44* (2013.01); *G06F 21/6272* (2013.01); *G06F 21/645* (2013.01); *G06Q 30/04* (2013.01)

(58) Field of Classification Search
CPC .. G06F 21/6227; G06F 21/6272; G06F 21/44; G06F 21/645; G06F 21/31; G06Q 30/04

USPC ......................................................... 713/193
See application file for complete search history.

(56) References Cited

U.S. PATENT DOCUMENTS

| | | | | |
|---|---|---|---|---|
| 8,984,282 | B1 * | 3/2015 | Kragh | H04L 9/321 |
| | | | | 713/186 |
| 9,280,684 | B1 * | 3/2016 | Kragh | G06F 21/6227 |
| 10,255,419 | B1 * | 4/2019 | Kragh | H04L 9/3297 |
| 11,042,668 | B1 * | 6/2021 | Kassam-Adams | G06F 21/572 |
| 2020/0242269 | A1 * | 7/2020 | Narayanaswamy | G06F 21/88 |
| 2020/0320207 | A1 * | 10/2020 | Beno | G06F 21/64 |
| 2021/0192075 | A1 * | 6/2021 | Sweeney | G06F 21/6245 |

FOREIGN PATENT DOCUMENTS

EP   3460693 A1 * 3/2019 ............. G06F 21/00

* cited by examiner

*Primary Examiner* — Samson B Lemma
(74) *Attorney, Agent, or Firm* — Garlick & Markison; Timothy D. Taylor

(57) ABSTRACT

A method includes obtaining, by a consumer computing device of a data communication network, a temporary credential in accordance with a temporary credential protocol. The method continues with accessing, by the consumer computing device, a temporary vault in accordance with the temporary credential, where the temporary vault stores or is to store a set of shareable data records. The method continues with facilitating, by the consumer computing device, execution of a data analysis function on the set of shareable data records to produce an analytical result. The method continues with receiving, by the consumer computing device from the temporary vault, the analytical result. The method continues with storing, by the consumer computing device, the analytical result in memory associated with the user computing device.

15 Claims, 27 Drawing Sheets computing device 15

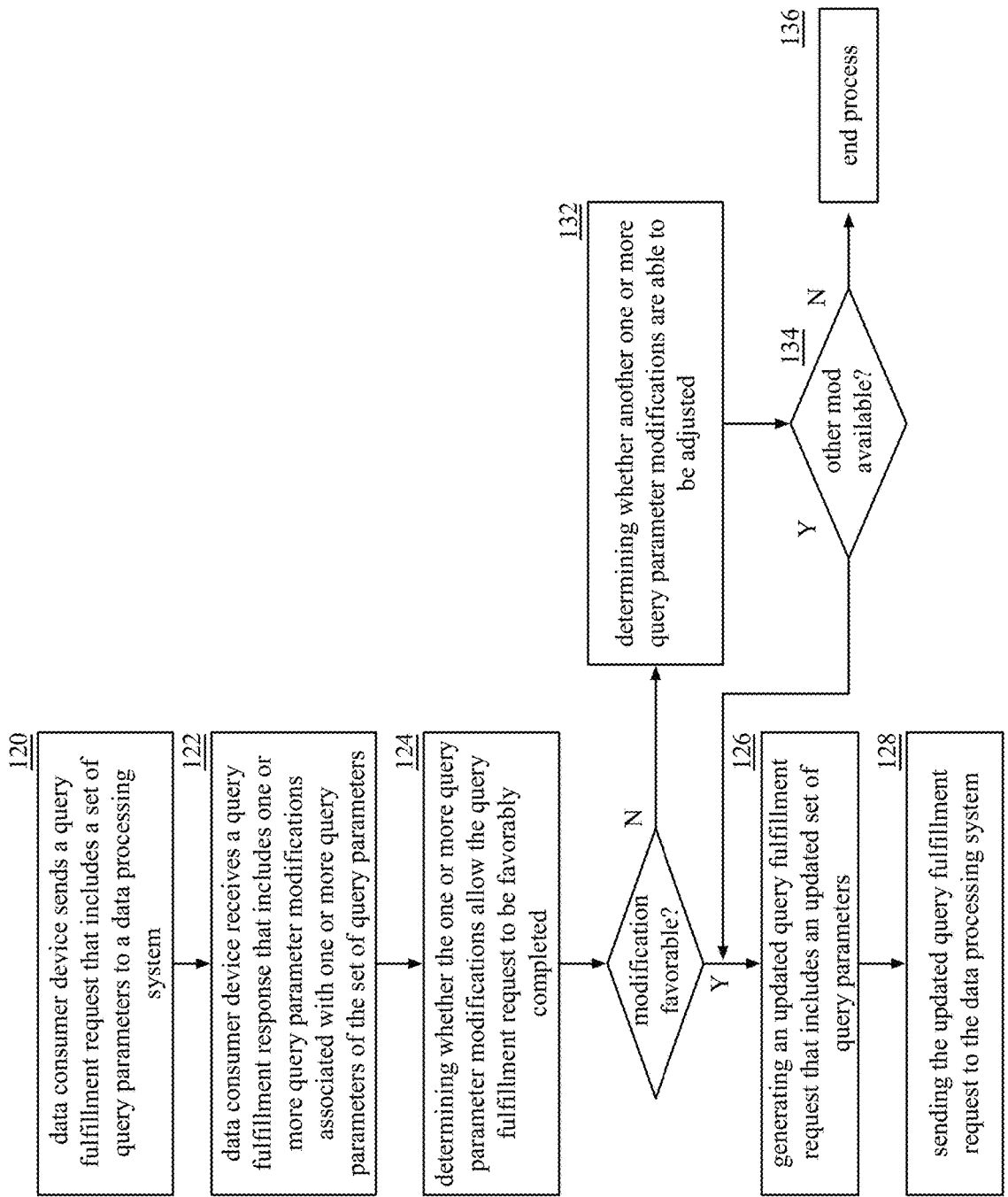

| shareable data sharing parameters 162 | | | | | | | | | | |
|---|---|---|---|---|---|---|---|---|---|---|
| legal requirements | data owner tier | avail. storage capacity | anonymity type | data type | average age of data | data collection type | estimated query interest | timestamp | | |
| data consumer type | consumer type | anonymity level | owner restrictions | normalization criteria | query type | data format | query history | data size | | |

FIG. 5C iteration 1

| ER ID | date | time in | time out | patient info | reason for visit | intake data | doctor | doctor notes | diagnosis | treatment | imaging | med(s) |
|---|---|---|---|---|---|---|---|---|---|---|---|---| shareable data record C 164
patient visit record 166

| ER ID | date | time in | time out | patient info | reason for visit | intake data | imaging | med(s) |
|---|---|---|---|---|---|---|---|---| shareable data record C-1 164 shareable data record C-1-1 164

| doctor | doctor notes | diagnosis | treatment |
|---|---|---|---| shareable data record C-1-2 164    shareable data record C-1-3 164 iteration 2

| ER ID | date | patient info | intake data | patient info | reason for visit | imaging | med(s) |
|---|---|---|---|---|---|---|---| shareable data record C-2 164 shareable data record C-2-1 164

| patient info | diagnosis | treatment |
|---|---|---| shareable data record C-2-2 164   shareable data record C-2-3 164 iteration 3

| ER ID | date | patient info | intake data | patient info | reason for visit |
|---|---|---|---|---|---| shareable data record C-3 164 shareable data record C-3-1 164

| patient info | med(s) | diagnosis | treatment |
|---|---|---|---| shareable data record C-3-2 164 iteration 4

| ER ID | date | time in | time out | reason for visit | intake data | diagnosis | treatment |
|---|---|---|---|---|---|---|---| shareable data record C-4 164

FIG. 5E

FACILITATING PROCESSING OF A QUERY ON SHAREABLE DATA IN A TEMPORARY VAULT

CROSS-REFERENCE TO RELATED APPLICATIONS

The present U.S. Utility Application claims priority to U.S. Provisional Application No. 62/890,861 entitled "Method for Sharing File or Object Based Data Using a Temporary Third-Party Network as a Broker Layer", filed Aug. 23, 2019, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to securely processing data.

Description of Related Art

As is known, data is collected for a variety of events. The events include sleeping, exercising, social media interactions, purchases, hospital visits, doctor's visits, urgent care visits and many more. As is further known, the collected data may be stored by one or more computers for later retrieval.

As is further known, the collected data may be stored in a variety of formats based on different data storage protocols. For example, data can be stored in text formats, video formats, graphics formats, image formats, and audio formats. The format used by one entity to store similar types of data (e.g., patient records) is often different than the format used by another entity. This makes it difficult to accurately share data.

Another issue with sharing data is data privacy. For example, the health insurance portability and accountability act (HIPAA) mandates that hospitals, doctors, pharmacists, and/or other entities that handle medical records, must keep the patient's personal information in confidence. To do this, most entities do not share medical record data or any portion thereof. As another example, general data protection regulation (GDPR) restricts the sharing of personal information regarding any type of data.

Another issue with sharing data is data tracking. For example, when an entity shares some of its data, the entity that shared the data does not know how the data and/or information associated with the data is being processed and/or analyzed.

BRIEF DESCRIPTION OF THE SEVERAL VIEWS OF THE DRAWING(S)

FIG. 4F is a flowchart of an example of a method of setting up shareable data access in accordance with the present invention;

FIG. 5C is a schematic block diagram of an example of a set of shareable data sharing parameters in accordance with the present invention;

FIG. 5E is a schematic block diagram of an embodiment of a shareable data record and a plurality of iterations of a shareable data record in accordance with the present invention;

FIG. 7J is a flowchart of an example of a method of facilitating processing of ordering queries in a data communication network in accordance with the present invention.

DETAILED DESCRIPTION OF THE INVENTION

Figure 1:
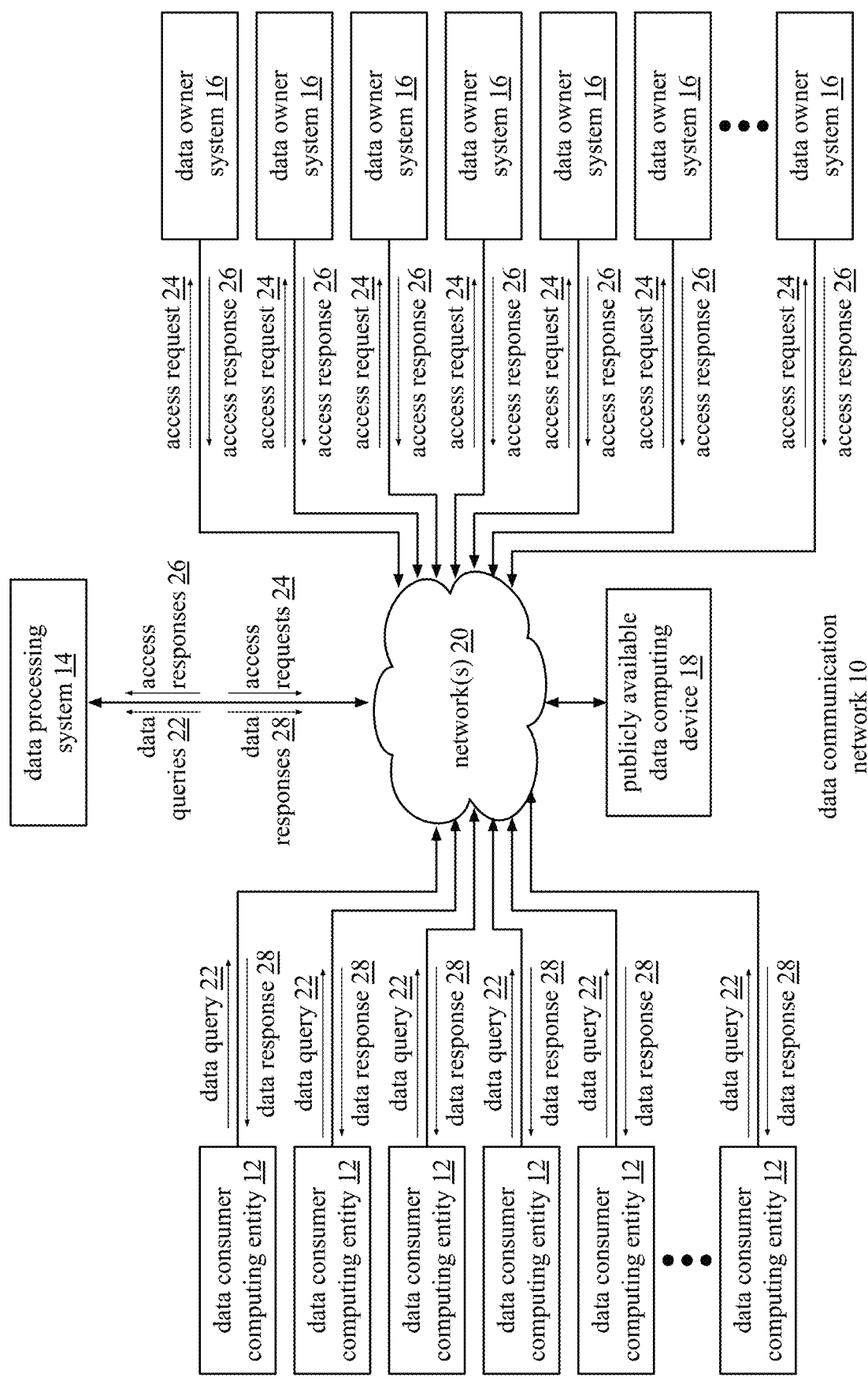
FIG. 1 is a schematic block diagram of an embodiment of a data communication network in accordance with the present invention.

FIG. 1 is a schematic block diagram of a data communication network 10 that includes a plurality of data consumer computing entities 12, a data processing system 14, a plurality of data owner systems 16, and one or more publicly available data computing devices 18 coupled via one or more networks 20. A network 20 may be a wide area network (WAN), a wireless WAN, a local area network (LAN), and/or a wireless LAN. A data consumer computing entity 12 includes one or more computing devices operated by a data consumer (e.g., a researcher, a hospital administrator, an insurance administrator, an engineer, a designer, a governmental agency, etc.). Note that the data processing system, the data owner system and/or the public available data computing device may include or be referred to as a computing device. An example of a computing device is described with reference to FIG. 2.

The data processing system 14 includes one or more computing entities (e.g., each including one or more computing devices) to process data queries 22 and to provide data responses 28. Each of the data owner systems 16 includes one or more computing entities (e.g., each including one or more computing devices) and functions to provide data access responses 26 to the data processing system 14 in accordance with data access requests 24. The publicly available data computing device 18 provides publicly available data (e.g., weather information, traffic information, sales information, demographic information, etc.) to the data processing system 14.

The data processing system 14 is operable to receive data queries 22 from the data consumer computing entities 12. For example, the data processing system receives a query 22 regarding a number of reported infections of a disease (e.g., human coronavirus, influenza, measles, etc.) in a particular region and/or timeframe. As another example, the data processing system receives a query regarding symptoms reported by patients currently taking a first medication and a second medication. As yet another example, the data processing system receives a query regarding a correlation of asthma and living with a smoker. These are but a few of the thousands or more queries that could be processed by the data processing system 14.

In response to the query, the data processing system 14 identifies one or more data owners (e.g., a controlling entity for a data owner system 16) and asks them to share their data. As an example, if the query 22 is regarding a number of reported infections of influenza in the state of Illinois in the last 7 days, the data processing system 14 will ask data owner systems 16 such as hospitals, doctors, governmental agencies, testing site, operators, etc. to participate in the query 22. In an instance, the data owners' physical location is utilized to determine which data owner systems to ask (e.g., any Illinois address plus addresses within a threshold distance (e.g., 5 miles, 30 miles, etc.) and/or threshold travel time (e.g., 20 min walk, 30 min bus ride, etc) of Illinois border). The query may further include selecting patients from data owners outside of Illinois (but within thresholds) that have an Illinois address to be included. Alternatively, or in addition to, the data owners register with the data processing system and identify data records they are willing to share and/or give access to and the data processing system determines, based on the query, which identified data records are related to the query. Still further alternatively, or in addition to, the data processing system determines whether there is a previous query result and/or a set of stored shareable data records that may be utilized in processing the current query request.

In this example, for each data owner system 16 that agrees to share their data, the data processing system 14 and the data owner system 16 work together to provide shareable data, as the access response 26. In one example, the shareable data is any data exchanged from a data owner system with another computing entity in accordance with an agreement between the computing entity and the data owner system. As another example, the shareable data is any data that complies with a privacy regulation (e.g., HIPAA, protected health information (PHI), personally identifiable information (PII), etc.) As another example, the shareable data is any data that the data owner determines to share according to its privacy policy. As one specific example, the shareable data includes a listing of patients (with identities anonymized) that have been tested for a particular human coronavirus in area A (e.g., zip code, county, state, etc.) within the last 7 days. As another specific example, the shareable data includes birthdays (with formats normalized) for patients reporting symptoms and are taking medication A. The normalizing and/or anonymizing of the shareable data will be discussed in one or more subsequent figures.

The data processing system 14 processes the access responses 26 from the data owner systems 16 participating in this query 22 to produce a data response 28. For example, the data response 28 may include a percentage of patients in area A that have tested positive for the particular human coronavirus in the last 7 days. As another example, the data response 28 may include a list of symptoms and ages of patients that were taking medication A. As yet another example, the data response may indicate the data processing system cannot facilitate completing the query (e.g., not enough data, restricted by law, restricted by data processing system, result not in accordance with agreement (e.g., result data greater than an agreed data size limit, etc.), etc.).

In an example, once the data response 28 is sent to the data consumer computing entity 12 (e.g., the data query has been completed or denied), the shareable data (e.g., related to the particular completed query 22) is deleted. In addition, the data processing system 14 isolates the shareable data of the data owner systems 16 from each other and from the data consumer computing entities 12. In this manner, the ability to conduct queries (e.g., research) is greatly enhanced while maintaining privacy of data from a vast number of data sources.

While the above examples were regarding medical data, the data stored by the data owner systems may be of any type. For example, a first data owner system stores social media information regarding it members, a second data owner system is a retailer that stores customer purchase transactions, a third data owner system stores medical information regarding its patients, a fourth data owner system stores insurance information regarding its customers, a fifth data owner system stores on-line delivery transactions (e.g., meal orders, groceries, rides, etc.), and so on. Data queries can be for a particular type of data (e.g., medical data) or they can be regarding a broad spectrum of data (e.g., medical data, shopping habit data, sleeping data, eating data, driving data, etc.).

Figure 2:
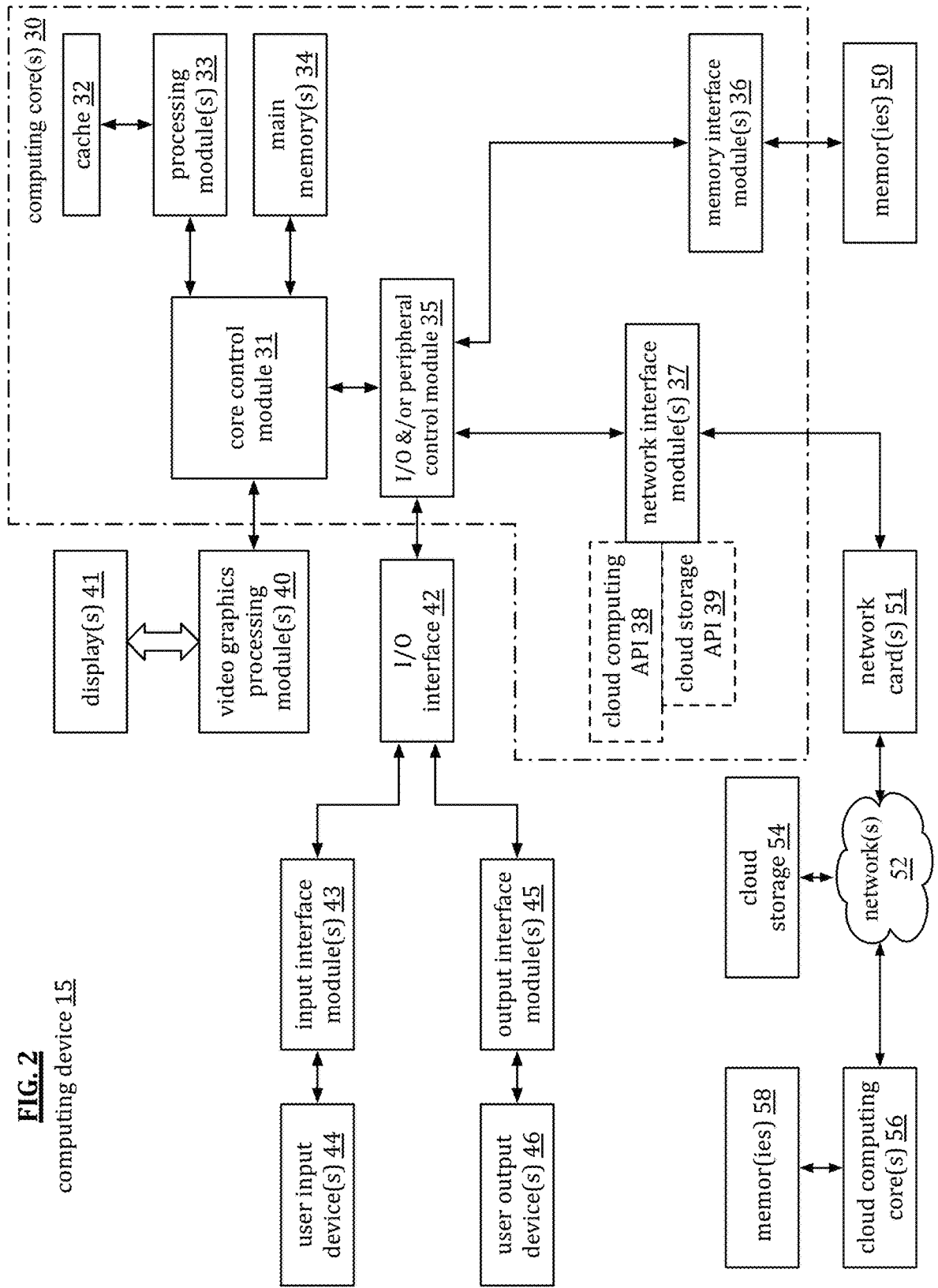
FIG. 2 is a schematic block diagram of an embodiment of a computing device in accordance with the present invention.

FIG. 2 is a schematic block diagram of an embodiment of a computing device 15 that includes computing core(s) 30, video graphics processing module(s) 40, display(s) 41, an input/output (I/O) interface 42, input interface modules(s) 43, user input device(s) 44, output interface module(s) 45, user output device(s) 46, memor(ies) 50 and network card(s) 51. A computing core 30 includes a core control module 31, a cache 32, processing module(s) 33, main memory(s) 34, I/O &/or peripheral control module 35, memory interface module(s) 36, network interface module(s) 37, and may also include a cloud computing application programming interface (API) 38 and a cloud storage API 39.

An optional extension of the computing device includes cloud storage 54, cloud computing core(s) 56, and/or memories 58 operably coupled to network(s) 52. In an example, the optional extension is a tenant in Amazon® Web Services (AWS) Simple Storage Service (S3). In another example, the optional extension works in concert with the computing core 30. In yet another example, the computing core 30 is a conduit to the cloud storage 54, cloud computing 56 and/or memories 58.

Note that a computing device 15 may be a portable computing device and/or a fixed computing device. A portable computing device may be a virtual reality device, an augmented reality device, a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment.

Figure 3A:
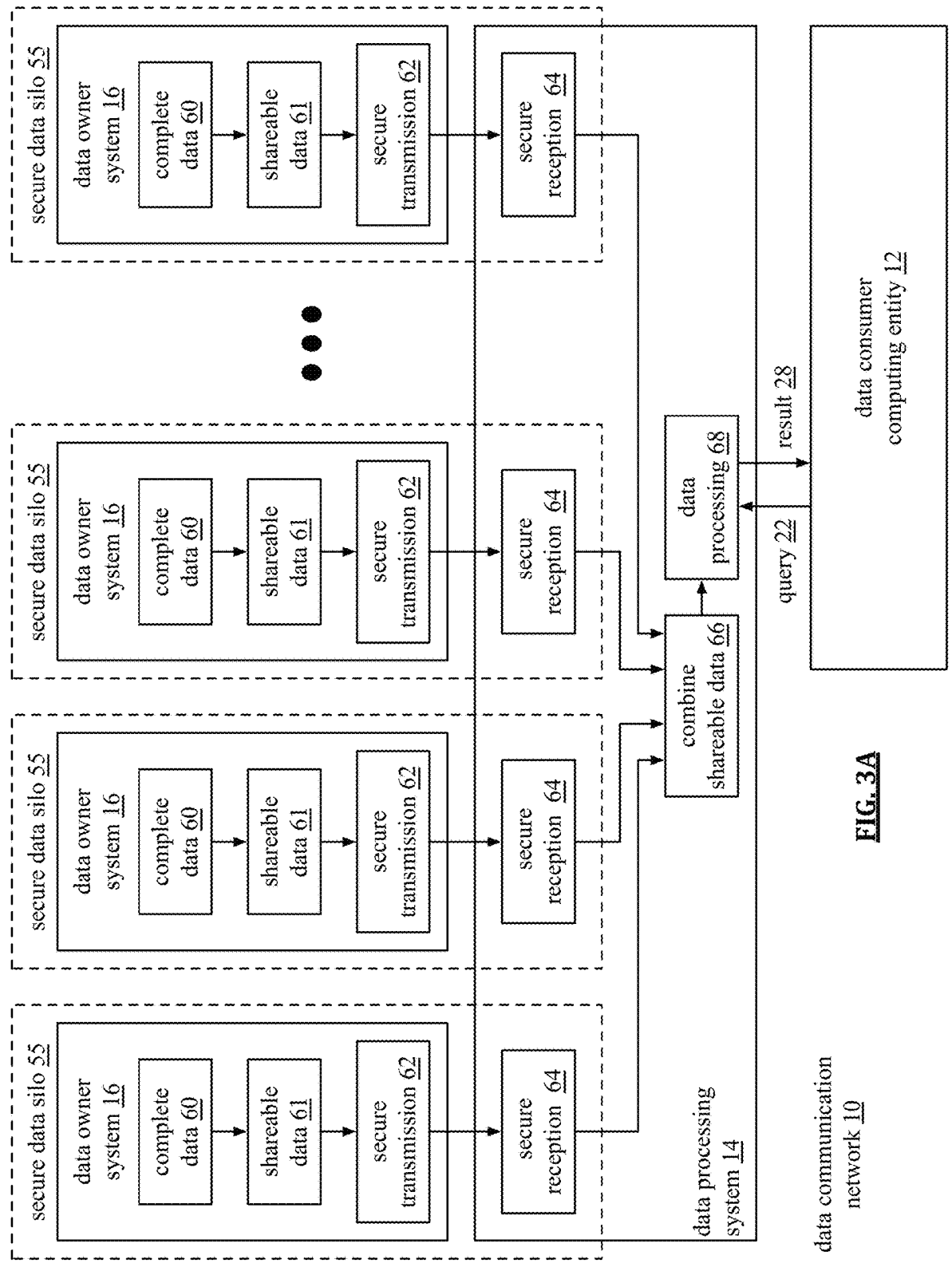
FIG. 3A is a flow diagram of an embodiment of processing a query using secure data silos in accordance with the present invention.

FIG. 3A is a diagram of an example of a secure data flow within the data communication network 10. In an example, to maintain security of a data owner's data, the data owner system 16 communicates with the data processing system 14 via a secure data silo 55. Each data owner system 16 stores complete data 60, which includes a plurality of records and each record includes a plurality of data fields. Some of the data fields includes data that cannot be shared by law, should not be shared in accordance with an agreement between the data owners and another entity (e.g., object of the data, a data consumer, another data source, etc.) and/or should not be shared in accordance with a data owner's own data privacy policy.

Within the secure data silo 55, selected complete data (e.g., some or all of it based on a query) may be modified (e.g., altered, normalized and/or anonymized) to produce shareable data 61. The selected complete data is anonymized by removing, obscuring, and/or altering data in data fields of the records that contain information that should be kept private (e.g., in accordance with the data owner's privacy policy). The anonymized data may then be normalized to a desired format (e.g., data field orientation to line up columns of data, specific field formatting so data in columns is presented in the same manner, etc.). This is all done within the control of the data owner system 16.

Via a secure data transmission 62 and a secure data reception process 64 (e.g., encryption, virtual private network (VPN), transmission control protocol/internet protocol (TCP/IP) with secure sockets layer (SSL) encryption, a public key infrastructure (PKI), a secure communication link, etc.), the shareable data 61 is received by the data processing system 14. This is done within the secure data silo 55 as well. Alternatively, or in addition to, the shareable data is received by a temporary vault, which is discussed in greater detail with reference to one or more subsequent Figures.

In this manner, each secure data silo 55 operates independently from the other secure data silos 55 insuring that each data owner system's complete data 60 is securely maintained within its data silo and is prevented from being accessed by the other data owner systems 16 and/or by any entity outside of the data owner system 16. The secure data silos 55 also isolates a data owner system's shareable data 61 from other data owners and from data consumers.

The data processing system 14 combines the shareable data 61 from the various data owner systems to produce combine shareable data 66. The data processing system 14 performs data processing 68 on the combined shareable data 66 based on a query 22 to produce a result 28. Alternatively, the data processing system 14 may perform data processing on shareable data 61 from one or more data owner's and then combines the shareable data. Once the data result 28 is sent to a data consumer, the combined shareable data 66 and the shareable data 61 from each data owner system is deleted.

Thus, via the data processing system 14, data from a variety of data owner systems can be used by a variety of different data consumers in response to a variety of queries without compromising privacy requirements of the data. This is achieved because the complete data (i.e., the data including privacy information) never leaves the control of the data owner system 16. Further, only the data processing system (e.g., or alternatively, a temporary vault) has access to the shareable data 61 from the data owner systems. With this controlled access, data consumers obtain analysis of a broad spectrum of data without having access to any of the complete data and/or any data that is not shareable data; thus privacy of the data is not compromised.

Figure 3B:
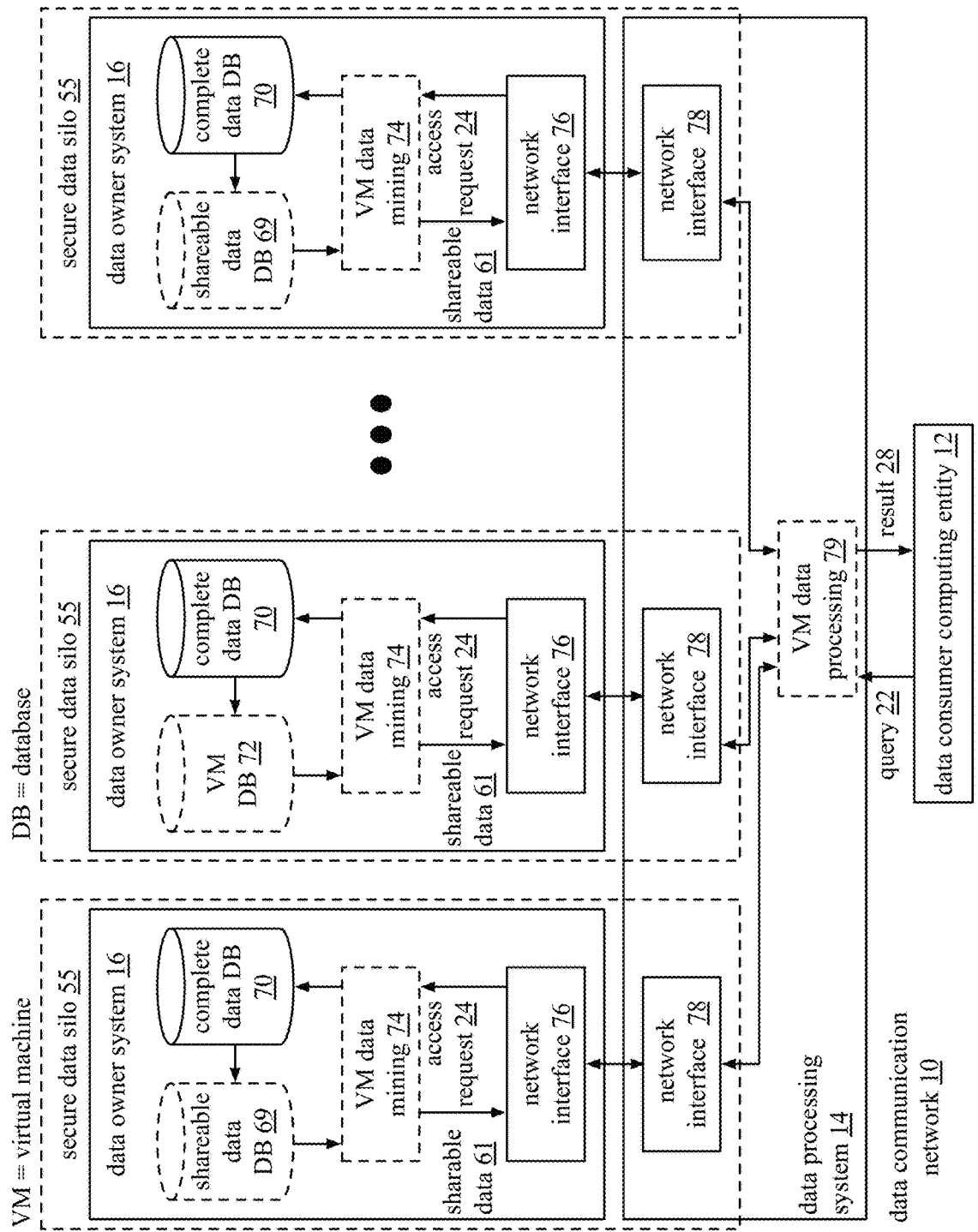
FIG. 3B is a schematic block diagram of another embodiment of processing a query using secure data silos in accordance with the present invention.

FIG. 3B is a schematic block diagram of an embodiment of the processing a query 22 in a data communication network 10 that includes secure data silos 55 around each of the data owner systems 16. In this example, a secure data silo 55 includes a data owner system 16 and a network interface 78 of a data processing system 14. The data owner system 16 and the data processing system 14 collaborate to setup a temporary VM data mining 74 and additionally may work together to populate a shareable data DB 69 with shareable data records mined from completed data records stored in complete data DB 70.

As an example of operation, upon receiving a query 22 from a data consumer computing entity 12, the data processing system 14 sends requests to data owner systems 16 to participate in providing shareable data for the query 22. When the data owner systems wish to participate, the data processing system 14 and the participating data owner system 16 collaborate to create the VM data mining 74 and/or the shareable data DB 69 in the data owner systems. The collaboration includes one or more of registering with the data processing system by the data owner, registering with the data owner system by the data processing system, exchanging temporary credentials, setting up permissions, creating a virtual private cloud (VPC), creating a virtual private network, creating a container (e.g., lightweight scalable application with associated environment variable, configuration files, libraries and/or software dependencies), and creating a virtual vault. The collaboration will be discussed in further detail with reference to one or more subsequent figures.

In a specific example, the virtual vault includes one or more of a container management entity (e.g., Kubernetes cluster, data processing system's application programming interface (API)) to manage a VPC's containers, a storage (e.g., an output bucket), one or more proxies to gate and log access to files and/or APIs within the virtual vault, and a VPC. The virtual vault or temporary vault is discussed in further detail with reference to one or more subsequent figures.

The VM data mining 74 functions to search a complete data DB 70, which stores complete data, for sets of data records corresponding to the access request 24. The VM data mining 74 may also modify (e.g., normalize, anonymize, privatize according to an agreement, etc.) the sets of data records to produce shareable data records that are stored in the temporary VM DB 72.

In an example, the VM data mining 74 is allowed access (e.g., via a virtual private cloud (VPC), in accordance with security credentials, etc.) to a portion of the complete data DB 70 storage location (e.g., physical addresses, logical addresses). Note the shareable data DB 69 may be a portion of the complete data DB (e.g., within a same storage location) or may be in a separate storage location. Further note in this example, the shareable data DB 69 stays within the data owner system.

The VM data mining 74 sends the shareable data 61 (e.g., as access responses 26) via the network interfaces 76 and 78 to the data processing system 14 (or alternatively, to a temporary vault). The VM data processing 79 processes (e.g., executes one or more functions based on the query) the shareable data 61 to produce result 28, that is sent to the data consumer computing entity and/or sent to a storage location.

Figure 3C:
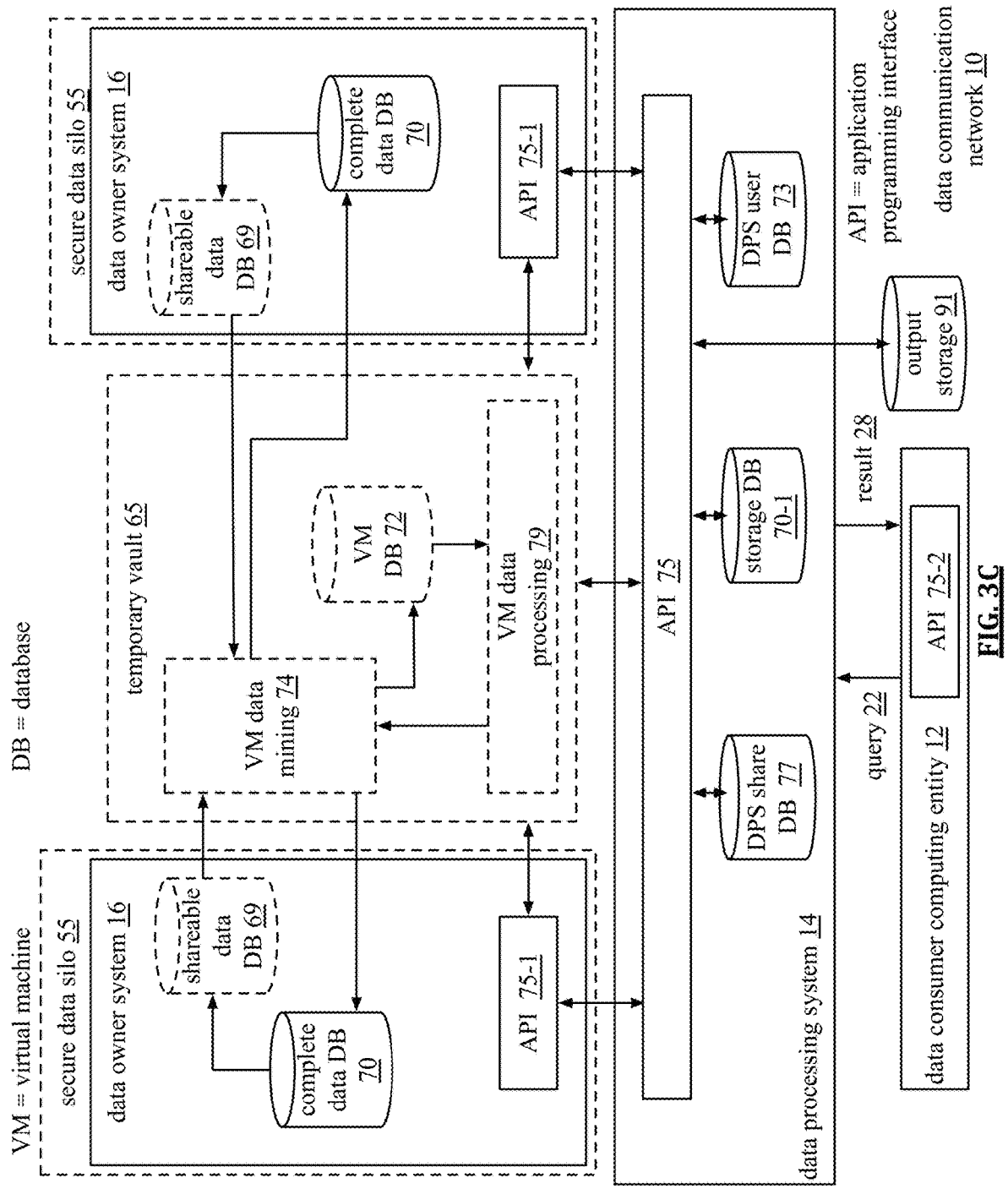
FIG. 3C is a schematic block diagram of another embodiment of processing a query using secure data silos in accordance with the present invention.

FIG. 3C is a schematic block diagram of an embodiment of processing a query in a data communication network 10 that includes a temporary vault 65. The data communication network 10 includes a data processing system (DPS) 14, a plurality of data owner systems 16, an output storage 91, and a temporary vault (e.g., a virtual vault) 65. A data owner system 16 includes an application programming interface (API) 75-1, a complete data database (DB) 70 and a shareable data DB 69. The temporary vault includes one or more of a third party cloud network, a virtual private cloud (VPC), a virtual private network (VPN), a virtual machine (VM), and a container. In an example, the temporary vault is a VPN with gated outbound and inbound access.

The data processing system 14 includes an API 75, a DPS share DB 77, a storage DB 70-1 and a DPS user DB 73. The DPS share DB 77 includes information (e.g., identity, data sharing agreements, data sharing history, and/or payment history, etc.) on data owners of a data communication network. The DPS user DB 73 includes information (identity, query history, payment history, etc.) on data consumers of the data communication network. The storage DB 70-1 includes one or more of shareable data records, query results, credentials, and agreement. The information of databases 70-1, 73, and 77 may also include one or more of registration information, a username, a password, and keys (e.g., cryptographic). In an example, the information is utilized in accordance with a temporary credential protocol to setup a temporary vault for processing of shareable data. In an example, the temporary credential protocol includes setting up access (e.g., providing credentials, providing login information, etc.) for use of one or more of a virtual private cloud (VPC), a virtual machine (VM) and a container to obtain and/or process the shareable data.

In another example, the temporary credential protocol includes establishing first temporary security credentials for access to the temporary vault and/or the virtual machines 72, 74 and 79. After the virtual machine is created and in accordance with the first temporary security credentials, the temporary credential protocol further includes establishing second temporary security credentials for the virtual machine to access the memory of a data owner system. In an instance, the temporary security credentials include an access key pair and a session token. The access key pair includes an access key identification and a secret key. In another instance, the temporary security credentials include a username and password.

As an example, the data processing system 14 sets up the temporary vault 65 to utilize in returning a result 28 in response to a query 22. In this example, the temporary vault 65 includes a virtual machine (VM) data mining 74, a VM DB 72, and a VM data processing 79. In an embodiment one or more of the VMs may be implemented via one or more containers.

As an example of operation, upon receiving a query 22 from a data consumer computing entity, the data processing system sends requests to data owner systems to participate in providing shareable data for the query. Alternatively, or in addition to, the data processing system sends requests to data owner systems that have previously registered with the data processing system and/or have previously agreed to share data regarding the type of query received. Further, alternatively, or in addition to, the data processing system 14 obtains stored shareable data records and/or query results (e.g., stored in storage DB 70-1) relevant to the query. The data processing system may then send the obtained shareable data records and/or query results to the temporary vault or to the data consumer computing entity. As a specific example, when the query has already been run previously and stored as a first query result, the data processing system sends the first query result to the data consumer computing entity 12.

Continuing with the above example, when the data owner systems wish to participate, the data processing system 14 and the participating data owner system 16 collaborate to create access to at least a portion of the complete data DB 70 and/or the shareable data DB 69 in the data owner system. The collaboration includes one or more of registering with the data processing system by the data owner, registering with the data owner system by the data processing system, exchanging temporary credentials, setting up permissions, creating a virtual private cloud (VPC), creating a virtual private network, creating a container (e.g., lightweight scalable application with associated environment variable, configuration files, libraries and/or software dependencies), and creating a temporary vault.

In a specific example, the temporary vault includes one or more of a container management entity (e.g., Kubernetes cluster, data processing system's application programming interface (API)) to manage a VPC's containers, memory (e.g., an output bucket, random access memory (RAM), VM DB 72, etc.), one or more proxies to gate and log access to files and/or APIs within the temporary vault, and a VPC.

The VM data mining 74 searches the complete data DB 70 for data records based on the query 22. The VM data mining stores data records found in the search in the shareable data database (DB) 69 in the data owner system 16. The VM data mining 74 may also modify (e.g., normalize, anonymize according the a regulation (e.g., HIPAA), privatize according to an agreement, etc.) the sets of data records.

Alternatively, or in addition to, the VM data mining 74 searches (e.g., based on a command from API 75, 75-1, and/or 75-2) shareable data DB 69 for data records based on the query 22 and stores the data records found in the search in the VM DB 72 of the temporary vault 65. This may be done for a variety of reasons. For example, when a data owner system only allows access to shareable data DB, when a data owner system has already stored shareable data in shareable data DB, and/or when a request indicates to search both complete data DB and shareable data DB to fulfill the query. In one example, the shareable data database (DB) 69 is a temporary vault or container. The VM data mining 74 is further operable to retrieve the data records stored in each shareable data DB 69 and store them (e.g., as combined shareable data, as individual shareable data) in the VM DB 72 within the temporary vault 65.

In an example, the VM data mining 74 is allowed access (e.g., via a virtual private cloud (VPC), in accordance with security credentials, being within an internet protocol (IP) address range, etc.) to a portion of the complete data DB 70 storage location (e.g., physical addresses, logical addresses). Note the shareable data DB 69 may be a portion of the complete data DB (e.g., within a same storage location) or may be in a separate storage location within the control of the data owner system. Further note the shareable data DB includes one or more of volatile memory (random access memory (RAM), a register, etc.) and non-volatile (NV) memory (e.g., NVRAM, flash memory, read only memory, a disk drive, etc.).

As a specific example, VM data mining 74 accesses complete data DB 72 of a first data owner system 16 to search for data records based on the query 22 and/or accesses shareable data DB 69 of a second data owner system 16 to search for data records based on the query. In an instance, the VM data mining 74 cannot access complete data DB 70 of a data owner system 16. Thus, only shareable data DB 69 of the data owner system 16 can be accessed by VM data mining 74 (e.g., in accordance with an allowed IP range), which improves security. Further, one or both of the complete data DB 70 and the shareable data DB 69 only allow read-only access in accordance with the temporary credential protocol, which maintains integrity of the data.

In another instance, a data owner system 16 restricts certain data fields of a data record (e.g., data fields that include non-shareable data) from being stored in the shareable data DB 69, thus maintaining security of the data. Thus, only data from shareable data DB may be sent to VM DB 72 of the temporary vault 65. In yet another instance, the VM data mining sends a query request to the data owner system, and receives a query response that includes data records of shareable data, thus the elements within temporary vault 65 do not have access within data owner system.

The VM data processing 79 processes (e.g., executes one or more functions based on the query) the combined shareable data to produce one or more results 28. As an example, executable code (e.g., of a compute code) in the form of a container associated with a data consumer is executed on the combined shareable data to produce the result. Having produced the result 28, it is sent to the data processing system 14, which may store the result 28 in an internal (e.g., only data processing system has access to) storage DB 70-1, to the data consumer computing entity 12, and/or an external (e.g., third party storage) output storage 91. Alternatively, or in addition to, the result 28 is sent directly to output storage 91. Note output storage may be temporary storage that is deleted after a certain period of time (e.g., 30 min, 2 days, etc.) and/or in accordance with an agreement (e.g., after it is accessed by a data consumer computing entity).

As such, via the secure data silos 55 and the temporary vault 65, data from a variety of data owner systems can be used by a variety of different data consumers in response to a variety of queries without compromising privacy requirements of the data. This is achieved because the non-shareable data (e.g., data including privacy information) never leaves the data owner system 16. Further, in an embodiment, only the temporary vault has access to the shareable data from the data owner systems. With this controlled access, data consumers obtain analysis of a broad spectrum of data without having access to any of the complete data; thus privacy of the data is not compromised, while ability to perform queries on a vast amount of data is greatly improved.

Figure 3D:
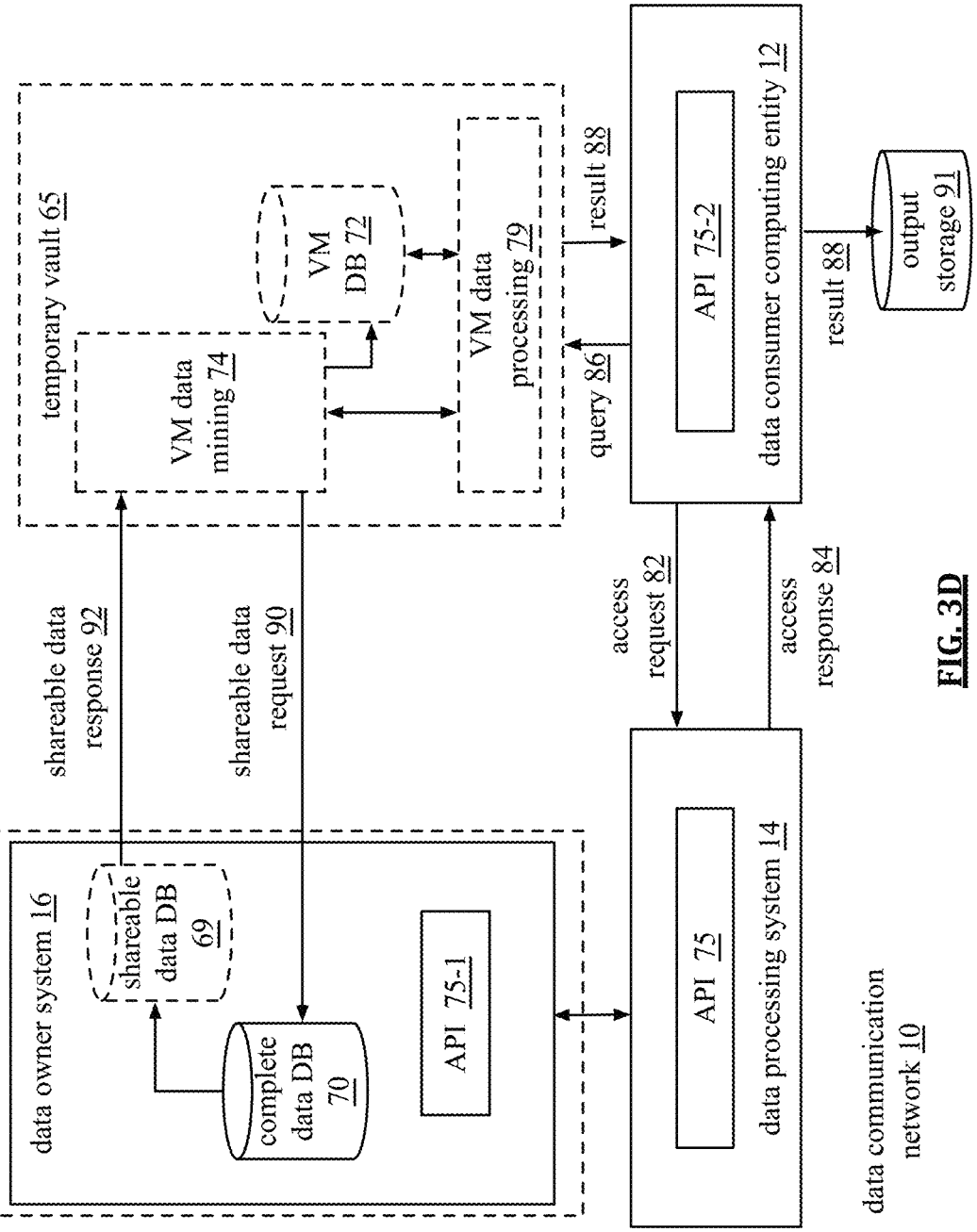
FIG. 3D is a schematic block diagram of an embodiment of processing a query in a data communication network in accordance with the present invention.

FIG. 3D is a schematic block diagram of an embodiment of processing a query in a data communication network 10 that includes a data consumer computing entity 12, a data processing system 14, a data owner system 16, an output storage 91 and a temporary vault 65. The data owner system 16 includes an application programming interface (API) 75-1, a complete data database (DB) 70 and a shareable data DB 69. The temporary vault 65 includes a virtual machine (VM) data mining 74, a VM DB 72 and a VM data processing 79.

In an example of operation, the data consumer computing entity 12 sends an access request 82 to data processing system 14. The access request includes one or more of a query, query parameters, registration information and payment information. The data processing system sends back access response 84 that includes one or more of modified query parameters (e.g., that would fulfill the query), credentials and execution optimization information (e.g., identity of temporary vault 65, timeframe for scheduling query completion, related results, etc.). A credential is one of a temporary credential (e.g., expires after use, expires after a timeframe, etc.) and a non-temporary credential (e.g., does not expire unless revoked by owner, etc.). In an example, the data processing system creates the credentials. In another example, the data processing system obtains the credentials from another entity (e.g., the data owner system).

The data consumer computing entity 12 accesses the temporary vault 65 based on the access response. For example, the data consumer computing entity 12 utilizes a temporary credential received in the access response 84 to access the temporary vault. In one example, the data consumer computing entity provides compute code to the temporary vault for utilizing in processing the query 22. Note the data consumer computing entity 12 may modify (e.g., change, add, delete) portions of the compute code during the processing of the query.

The VM data mining 74 sends shareable data request 90 to the data owner system 16 to mine data records of the complete data DB that may be used to fulfill query 86. The VM data mining 74 stores useable data records (e.g., have data fields corresponding to query 86) in shareable data DB 69 as shareable data records. The VM data mining receives shareable data response 92 that includes a set of shareable data records (e.g., the mined shareable data records and additional shareable data records previously stored in shareable data DB) and stores the set of shareable data records in the VM DB 72. The VM data processing 79 executes one or more analytical functions on the set of shareable data records to produce an analytical result. The data consumer computing entity 12 then receives the result 88 and may store the result in output storage 91.

Figure 4A:
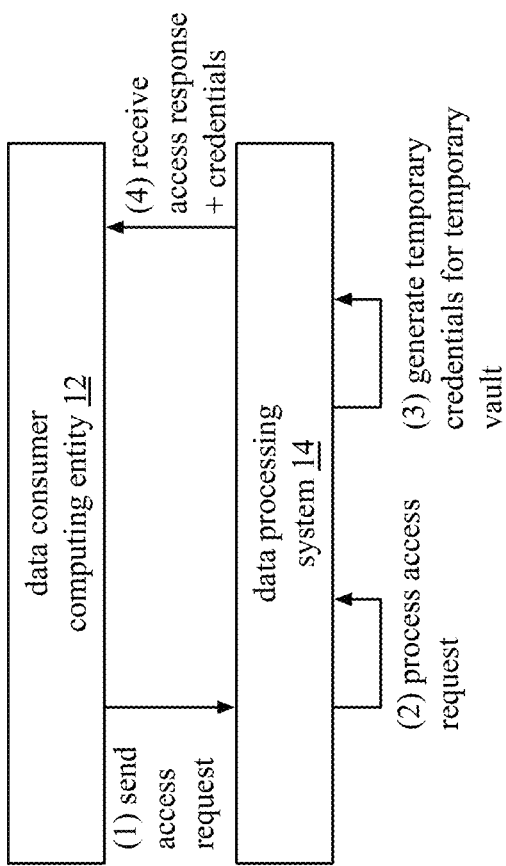
FIGS. 4A-4D are schematic block diagrams of an example of data consumer computing entity facilitating processing of a query in a data communication network in accordance with the present invention.

FIGS. 4A-4D are schematic block diagrams of an example of data consumer computing entity 12 facilitating processing of a query in a data communication network. FIG. 4A illustrates an example where a data consumer computing entity 12 sends an access request to a data processing system 14. In one example, the access request is requesting fulfillment of a query. In another example, the access request also includes registration information for the data consumer computing entity to register with the data processing system. The data processing system 14 processes the access request (2) to determine whether the query request can be completed. For example, for a registered data consumer computing entity, the data processing system verifies registration information associated with the data consumer computing entity. When the registration information is valid, the data processing system determines whether enough data owners are available to process request (e.g., the query includes parameters of 10 different data owner sources).

When the query can be fulfilled (e.g., in accordance with query parameters, in accordance with permissions for a data consumer tier associated with the data consumer computing entity), and/or when the data processing system determines the query request is allowed, the data processing system generates temporary credentials (3) for a temporary vault to utilize in fulfilling the query. In one example, the temporary credentials are a login and key for access to the temporary vault. In another example, the temporary credentials are a login and key for data consumer computing entity, via the temporary vault, to access a data owner system. After the temporary credentials are generated, the data consumer computing entity 12 receives an access response (4) from the data processing system that includes the credentials.

Figure 4B:
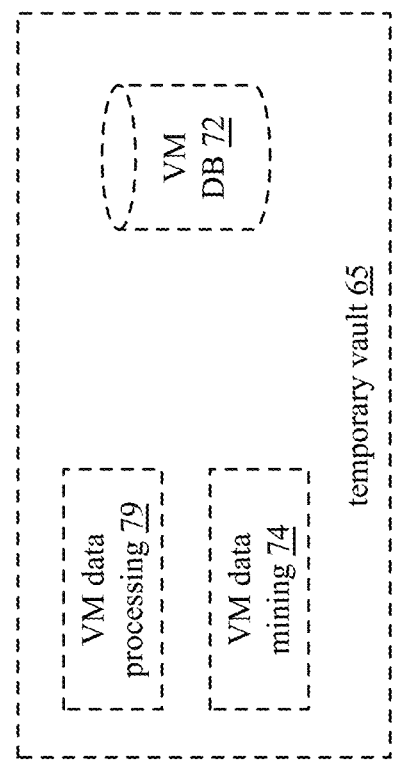

FIG. 4B illustrates a temporary vault 65 associated with the credentials generating the step (3). The temporary vault 65 includes a virtual machine (VM) processing 79, a VM data mining 74 and a VM database (DB) 72. The temporary vault may be spun up when the data processing system 14 generates the temporary credentials, may be already up and running, or may be scheduled to be spun up at a later time (e.g., in accordance with an optimized query schedule). In one example, the data processing system populates the VM DB 72 with a set of shareable data records.

Figure 4C:
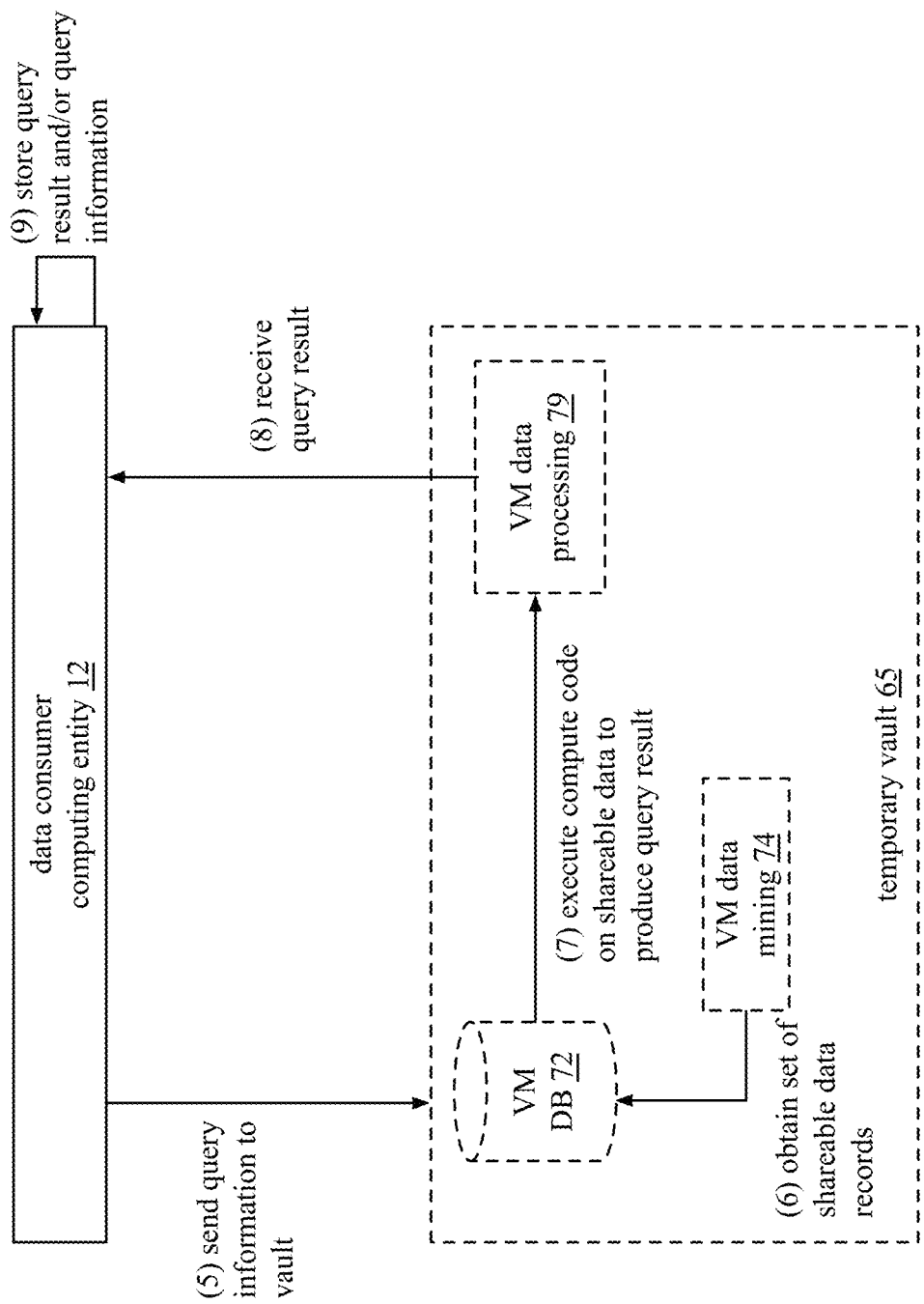

FIG. 4C illustrates the data consumer computing entity 12 sending query information to the temporary vault (5) to assist in processing the query. The query information includes one or more of scheduling information (e.g., when the query should be completed, when a query result should be completed), credentials for data owner systems and/or other temporary vaults, and query parameters (e.g., data type, data field of interest, etc.) and one or more functions to run on a set of shareable data records.

The VM data mining 74, in accordance with the query information, obtains a set of shareable data records from one or more data owner systems, publicly available data computing devices, and storage devices that include previously saved shareable data records. The VM data mining stores the set of shareable data records in the VM DB 72. The VM data processing 79 operates to execute the one or more functions on the set of shareable data records to produce one or more query results. The data consumer computing entity receives the one or more query results (8) and stores one or more of the query results and query information (9) used to produce the query result. Note that the data consumer computing entity may modify the query information. For example, upon receiving an unfavorable result, the data consumer computing entity modifies one or more query parameters and a function of the one or more functions.

Figure 4D:
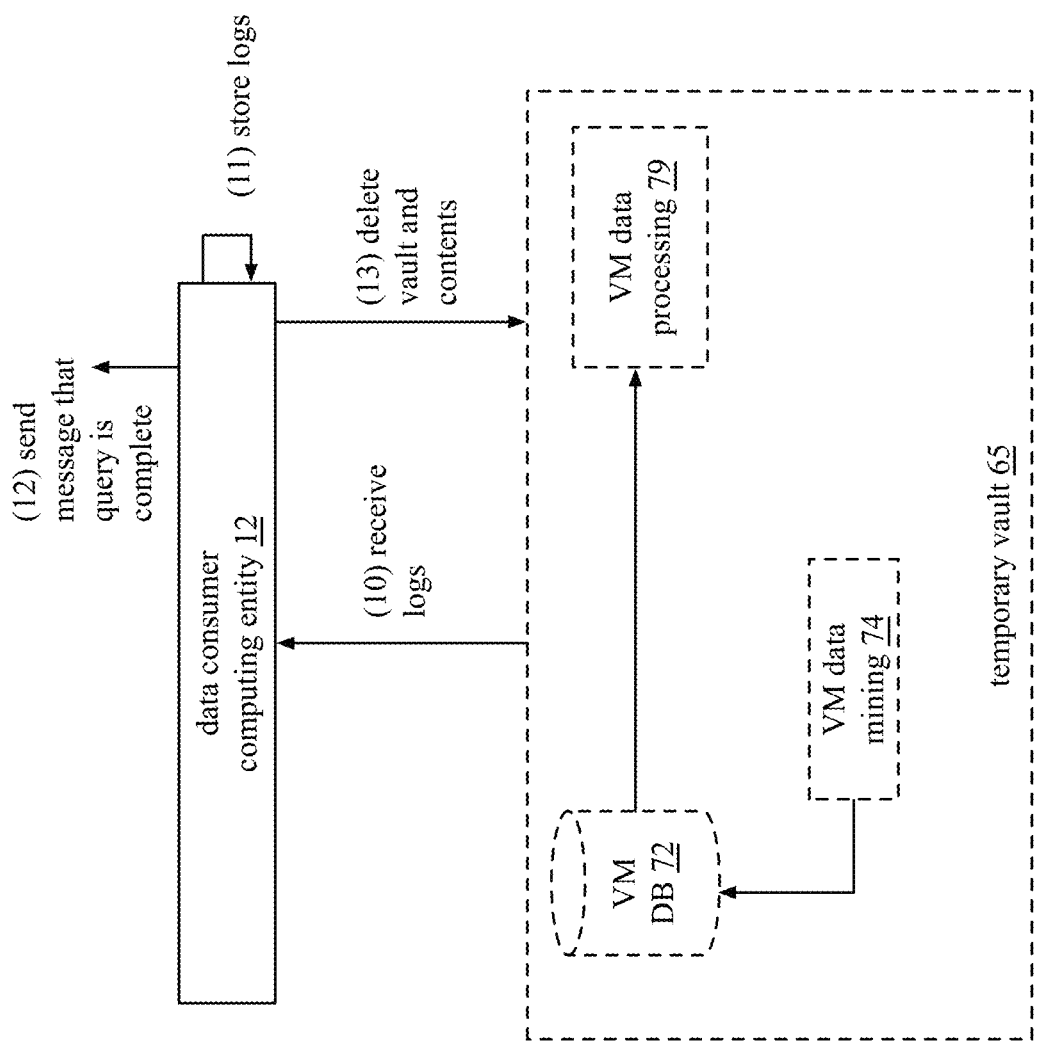

FIG. 4D illustrates in step 10, receiving logs from the temporary vault regarding processing the query (e.g., metadata regarding steps 1-9). The data consumer computing entity stores the logs (11) for later retrieval (e.g., respond to an audit request). In an example, the data consumer also sends the logs to one or more of a data owner, the data processing system, and an output storage bucket. Having stored the logs, the data consumer computing entity 12 sends a message to one or more of a data processing system and a data owner that the query fulfillment process is complete (12). For example, the data consumer computing entity sends a message to the data owner that the query is complete and tears down (13) the temporary vault 65 and deletes any shareable data records within the vault. As another example, the data consumer computing entity sends a message to the data processing system that the query is complete, and the data processing system tears down the temporary vault.

Alternatively, the VM DB 72 is copied to an output storage bucket. This allows a set of shareable data records to be reused without another access of data owner systems associated with the shareable data records. This further allows for another query to be run on the set of shareable data records (e.g., after the data consumer determines to modify a function, by another data consumer, in a verification process, etc.) without another access of data owner systems associated with the shareable data records.

Figure 4E:
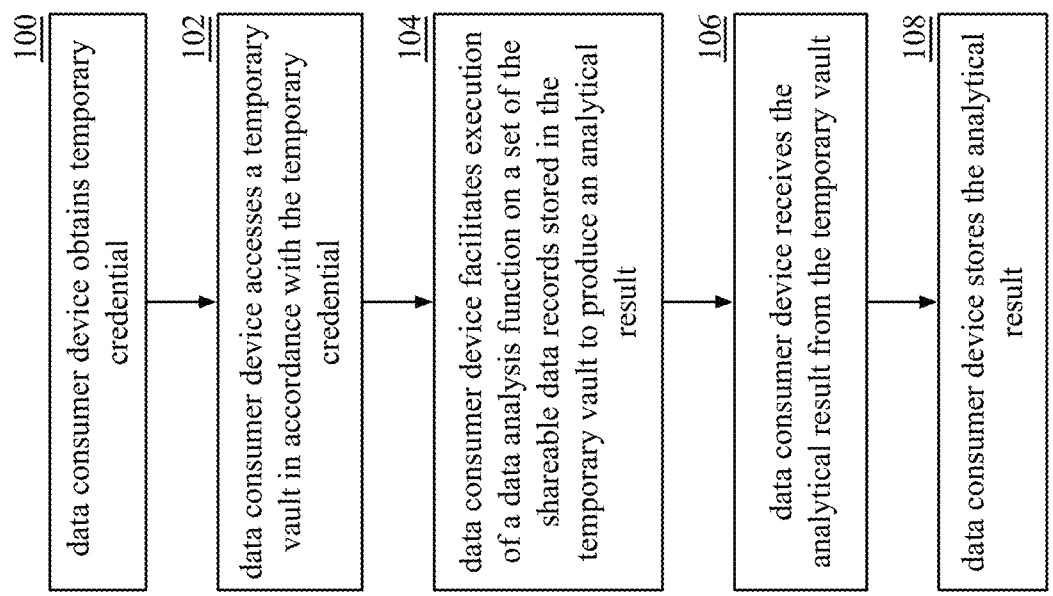
FIG. 4E is a flowchart of an example of a method of a data consumer device facilitating processing a query in accordance with the present invention.

FIG. 4E is a flowchart of an example of a method of a data consumer device (e.g., of a data consumer computing entity) facilitating processing a query. The method begins with step 100, where the data consumer device obtains a temporary credential in accordance with a temporary credential protocol. The temporary credential includes one or more of a token, a public/private keypair, multi-factor authentication, a username, a password, and an access key identifier and secret access key. In an example, the data consumer device obtains two credentials; a first for accessing a temporary vault, and a second for accessing a data owner system from the temporary vault.

The method continues with step 102, where the data consumer computing device accesses a temporary vault in accordance with the temporary credential. The method continues with step 104, where the data consumer device facilitates execution of a data analysis function on a set of the shareable data records stored in the temporary vault to produce an analytical result. In an example, generating a shareable data record of the set of shareable record includes modifying (e.g., under the control of a data owner computing device) at least one data field of a data record associated with the data owner to produce the shareable data record such that an identity associated with the data record is substantially unknowable.

In an example of storing shareable data in the temporary vault, a virtual machine of the temporary vault accesses data in a data owner's storage and modifies a data record of the data to render identity of the object to be substantially unknowable, where the data includes a set of data records that includes the data record that includes a plurality of data fields. In an example, a first set of data fields of the plurality of data fields is regarding identification (e.g., protected health information (PHI), personally identifiable information (PII), etc) of an object of the data record and a second set of data fields of the plurality of data fields is regarding data regarding the object. In an instance, the modifying the data record includes altering content of the first set of data fields.

In an embodiment, the modifying the data record includes altering content of the first set of data fields to render identity of the object to be substantially unknowable (e.g., removing PHI, removing PII, etc.). In another embodiment, the modifying the data record further includes altering content of the second set of data fields (e.g., when determining a likelihood the identity of the object could be determined based on content of the second set of data fields is above a privacy threshold). As another example, the modifying further includes normalizing the set of data records to produce the set of shareable data records.

The altering may include one or more of a variety of approaches. A first approach includes deleting the content of the first set of data fields. For example, bits of the content may be written with all 1's or all 0's. A second approach includes obfuscating the content of the first set of data fields. For example, bits of the content may be scrambled, and/or rearranged. A third approach includes replacing the content of the first set of data fields with generic content. For example, bits of the content are replaced with generic bits. Once the data is in shareable form, the virtual machine stores the shareable data in a virtual machine database of the temporary vault.

Having facilitated the execution of the analysis function, the method continues to step 106, where the data consumer device receives the analytical result from the temporary vault. For example, a VM data processing of the temporary vault sends, based on instructions from the data consumer computing device, the analytical result to the data consumer computing device. The method continues to step 108, where the data consumer device stores the analytical result in memory. In addition, the data consumer device may further send the analytical result to another data consumer computing device and/or temporary vault for use in processing a separate query.

FIG. 4F is a flowchart of an example of a method of setting up shareable data access that begins with step 120, where a data consumer device sends a query fulfillment request that includes a set of query parameters to a data processing system. For example, the query parameters includes one or more of the data analysis function, a threshold number of data records needed for the query, a data type, a data format, a data size, a data owner type, a time period, a specific data field of a data record, and a correlation between two data fields of one or more data records. As a specific example, the query parameters include a threshold number of 5,000 data records and a timeframe of the last 7 days.

The method continues with step 122, where the data consumer device receives a query fulfillment response that includes one or more query parameter modifications associated with one or more query parameters of the set of query parameters. For example, the query parameter modifications include changing the threshold number of data records needed for the query from 5,000 to 4,500. As another example, the query parameter modifications include changing the time period to last 8 days instead of last 7 days (e.g., when the last 8 days include >5,000 records).

The method continues with step 124, where the data consumer device determines whether the one or more query parameter modifications allow the query fulfillment request to be favorably completed (e.g., completed to produce a desired result). For example, the data consumer device determines whether utilizing 4500 data records maintains a margin of error for the query that is below a threshold.

When the modification is favorable, the method continues with step 126, where data consumer device generates an updated query fulfillment request that included an updated set of query parameters (e.g., query parameters updated to minimum of 4500 data records). The method continues with step 128, where the consumer computing device sends the updated query fulfillment request to the data processing system.

When the modification is not favorable (e.g., the margin of error is above the threshold), the method continues to step 132, where the consumer computing device determines whether another one or more query parameter modification are able to be adjusted that might allow the query fulfillment request to be favorably completed. For example, the data consumer device determines whether a data owner type can be adjusted, which may allow access to a greater number of data records for the same time period of the last 7 days. When another modification is available, the method continues to step 126, where the data consumer device generates an updated query fulfillment request that includes the updated set of query parameters (e.g., query parameters include more data owner types and 5,000 data records). When the modification is not available, the method ends at step 136.

Figure 5B:
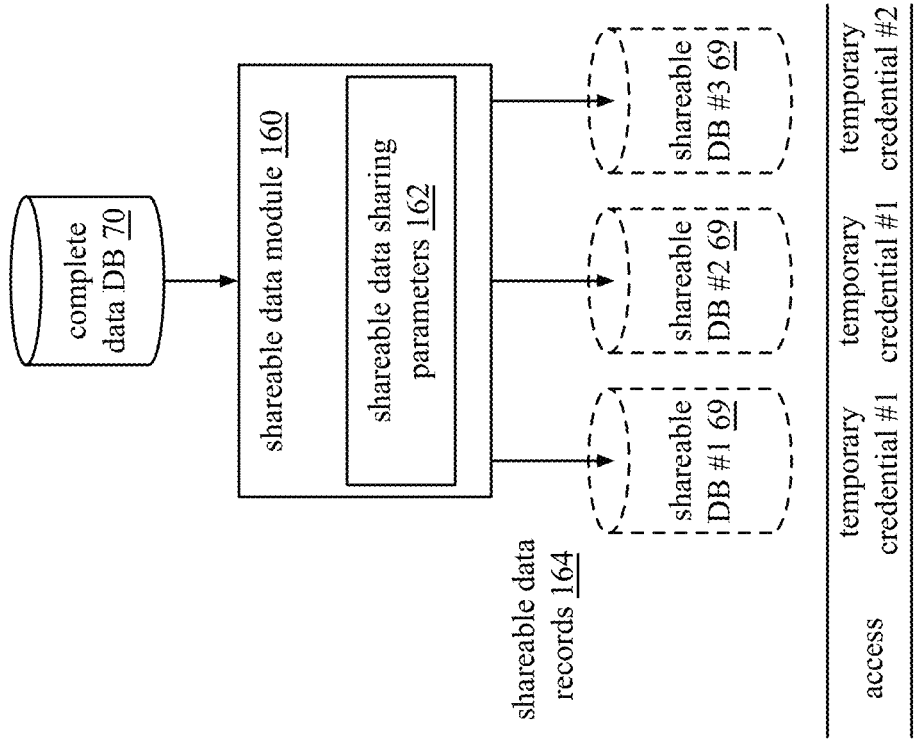
FIG. 5B is a schematic block diagram of an embodiment of generating iterations of shareable data in accordance with the present invention.
Figure 5A:
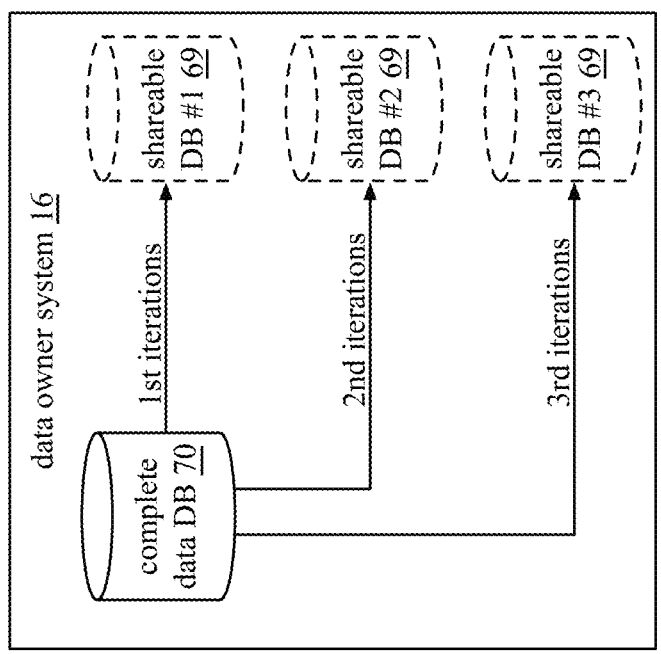
FIG. 5A is a schematic block diagram of an embodiment of iterations of shareable data in a data owner system in accordance with the present invention.

FIG. 5A is a schematic block diagram of an embodiment of a data owner system 16 that includes a complete data database (DB) 70 and a plurality of shareable data DBs 69. The shareable data DBs each operate to store one or more iterations of shareable data. In an example, an iteration includes one or more of a set of shareable data records, a shareable data record, and a portion of a shareable data record.

FIG. 5B is a schematic block diagram of an embodiment of generating iterations of shareable data. In this example, data records from complete data database (DB) 70 are retrieved by shareable data module 160. The shareable data module determines for the data records, whether the data records or a portion thereof should be stored in one of the plurality of shareable data DBs. The determination is based on one or more sets of shareable data sharing parameters 162. Note each shareable data DB 69 may be associated with a unique set of shareable data sharing parameters 162.

As an example, shareable data module retrieves 100 data records from the complete data DB 70 and determines, based on a first set of shareable data sharing parameters, to store 55 data records in shareable data DB #1 69, 40 data records in shareable data DB #2 69, and 5 data records in shareable data DB #3 69. As another example, shareable data module retrieves 100 data records from the complete data DB 70 and determines, based on a second set of shareable data sharing parameters, to store 25 data records in shareable data DB #1 69, 10 data records in shareable data DB #2 69, and 0 data records in shareable data DB #3 69. For example, not all the data records fall within criteria of the second set of shareable data sharing parameters.

In an embodiment, the shareable data DBs 69 require a temporary credential in order to access an iteration of a shareable data record stored in the shareable data DB 69. In one example, the temporary credential may be the same for multiple shareable data DBs 69. In another example, the temporary credential is different for each shareable data DBs 69.

FIG. 5C is a schematic block diagram of an example of a set of shareable data sharing parameters 162. Note from set to set the shareable data parameters may vary. In this example, the shareable data sharing parameters 162 include one or more of a data consumer type (e.g., academic, financial, etc.), legal requirements (e.g., HIIPA), a consumer type (e.g., under 500 employees, entity location (e.g., USA, Mexico, etc)), a data owner tier (level of sharing plan bought by data owner), anonymity level (e.g., level of encryption for shareable data), available storage capacity, owner restrictions (e.g., preferences on what data records to share (e.g., age data can be shared, ethnicity data cannot be shared)), anonymity type (e.g., what data fields have to be altered), normalization criteria (e.g., formats shareable data module can produce, acceptable types, applicable standards, etc.), data type, query type, average age of data, a data format (e.g., image, text, etc.), a data collection type, query history, estimated query interest (e.g., based on a history of queries for a data type), data size, and a timestamp.

Figure 5D:
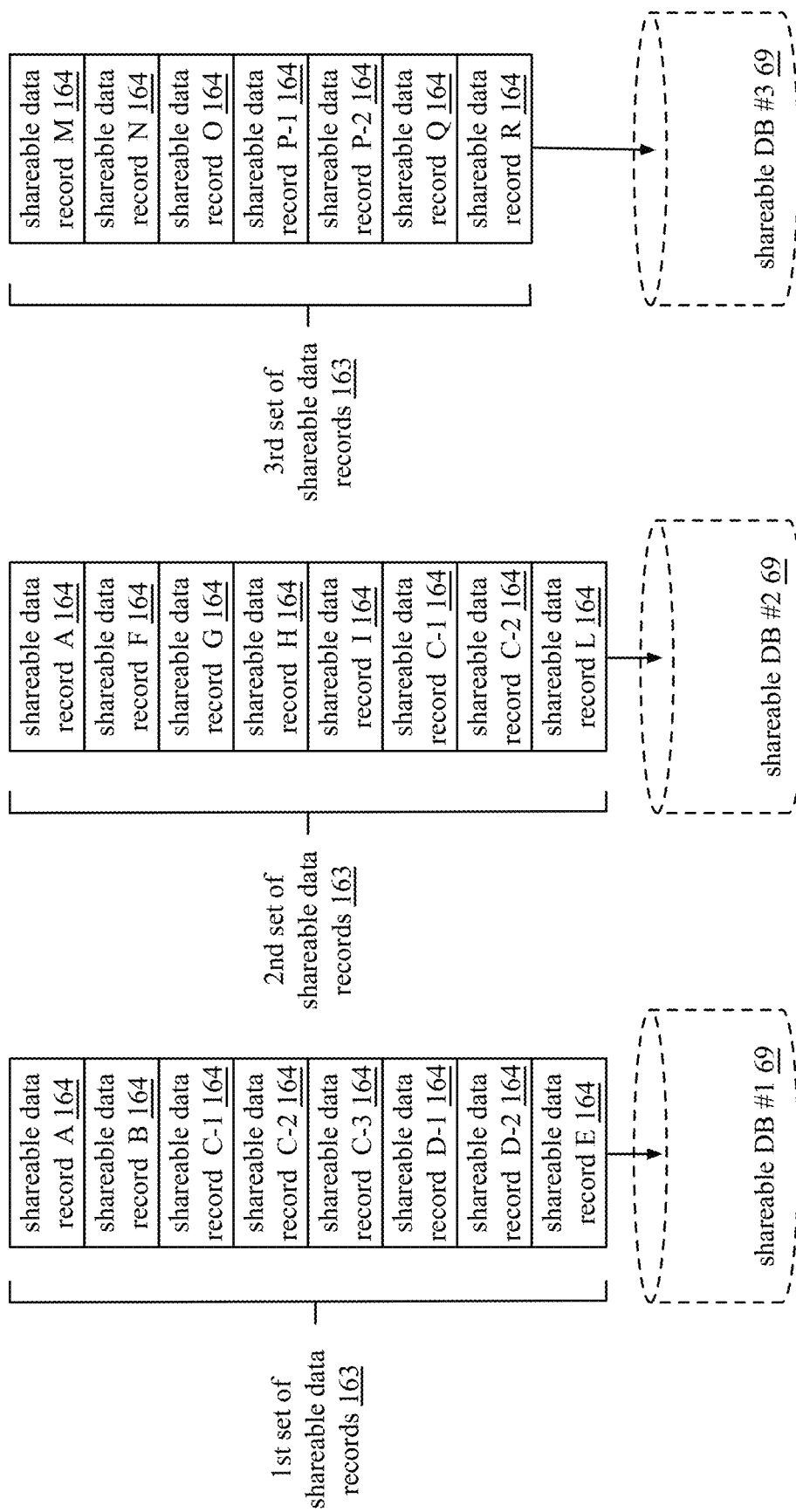
FIG. 5D is a schematic block diagram of an example of a plurality of sets of shareable data records in accordance with the present invention.

FIG. 5D is a schematic block diagram of an example of a plurality of sets of shareable data records 163. Each set of shareable data records includes a plurality of shareable data records 164. As shown, from set to set, the number of shareable data records may be different or the same. As is further shown, a shareable data record (e.g., shareable data record A) may be included in multiple sets of shareable data records (e.g., when the shareable data records within the shareable data sharing parameters associated with each respective set of shareable data records). Still further a shareable data record may include one or more iterations. For example, shareable data record C 164 includes iterations C-1, C-2 and C-3. As another example, shareable data record P 164 includes iterations P-1 and P-2. Note in one embodiment, a shareable data record is a data record that does not include data fields that include personally identifiable information and an iteration is a portion of the shareable data record. Further note, the iteration is based on fitting within a set of shareable data sharing parameters. As another example, a set of shareable data records is an iteration. For example, the first set of shareable data records is a first iteration, a second set of shareable data records is a second iteration, and a third set of shareable data records is a third iteration.

FIG. 5E is a schematic block diagram of an embodiment of a shareable data record and a plurality of iterations of a shareable data record. Each iteration may further include a sub-iteration (e.g., an iteration within another iteration). In this example, 4 iterations of a shareable data record C are generated based on 4 sets of shareable data sharing parameters. Iteration 1 includes sub-iterations C-1-1, C-1-2, and C-1-3. Sub-iteration C-1-1 includes a first set of data fields of shareable data record C, sub-iteration C-1-2 includes a second set of data fields of shareable data record C, and sub-iteration C-1-3- includes a third set of data fields of shareable data record C. In other iterations (e.g., iteration C-2) not all of the data fields of a shareable data record are included in the sub-iterations C-2-1, C-2-2, C-2-3 of the iteration.

Figure 6A:
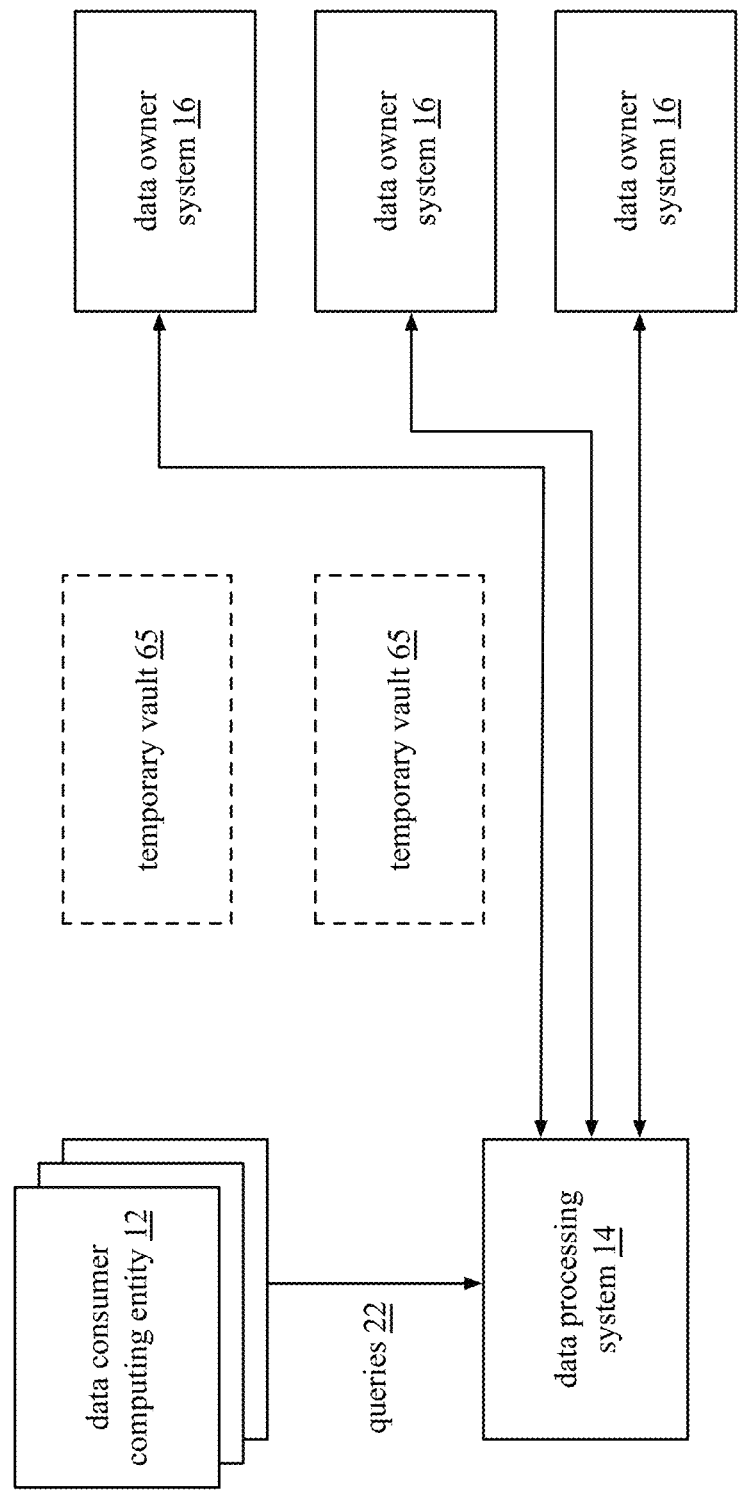
FIG. 6A is a schematic block diagram of an embodiment of a data communication network in accordance with the present invention.

FIG. 6A is a schematic block diagram of an embodiment of a data communication network that includes a plurality of data consumer computing entities 12, a data processing system 14, and a plurality of data owner systems 16 that utilize a plurality of temporary vaults 65 to facilitate processing a plurality of queries within the data communication network. Note that a temporary vault may facilitate processing in a query in conjunction with the data processing system, a plurality of data consumer computing entities and/or a plurality of data owner systems. Note in an example, a data consumer computing entity may be the same as a data owner system. For example, the data consumer computing entity may process a query to produce a result and become a data owner of the result. The result may then be shared with other data consumer computing entities to facilitate processing of other queries 22.

Figure 6B:
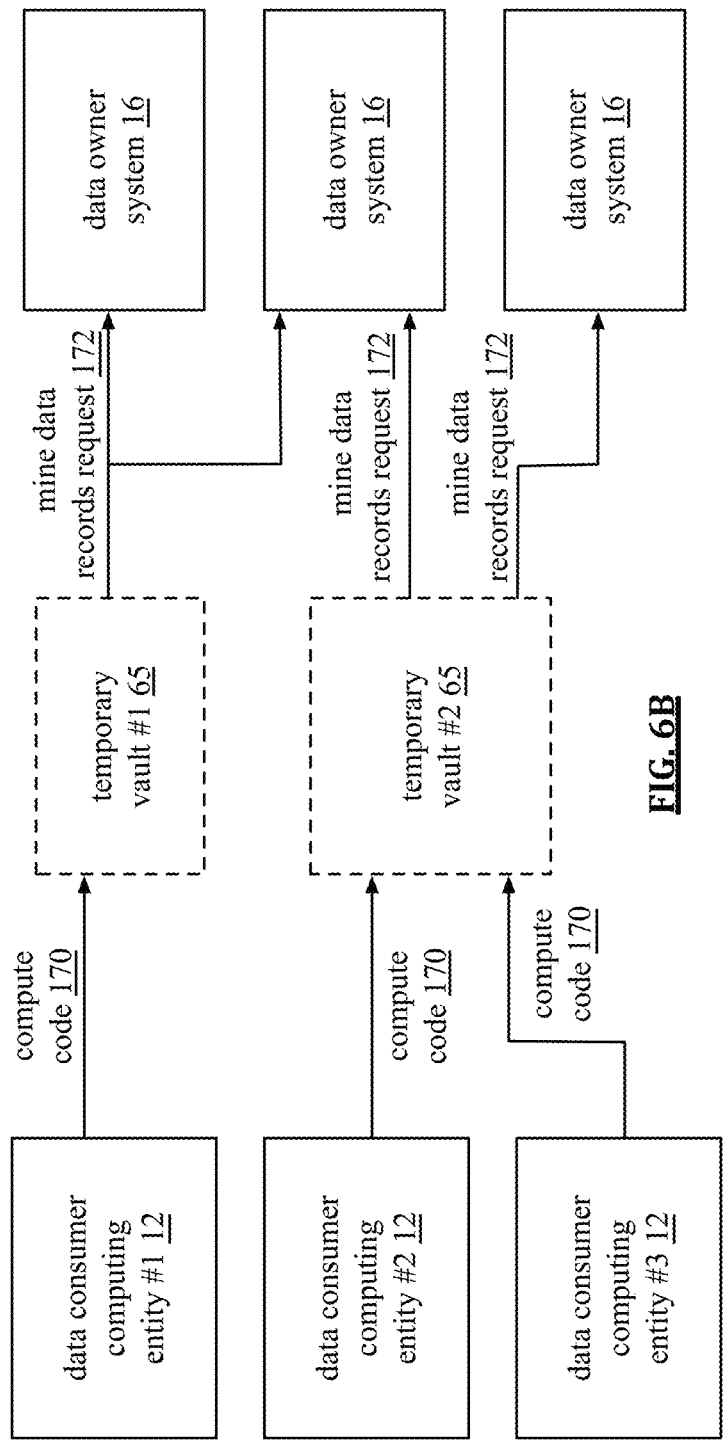
FIG. 6B is a schematic block diagram of an embodiment of facilitating processing of queries in a data communication network in accordance with the present invention.

FIG. 6B is a schematic block diagram of an embodiment of facilitating processing of queries in a data communication network. The data consumer computing entity 12 begins facilitating by sending compute code 170 to a temporary vault 65. In an example, compute code in part, instructs the temporary vault to send a mine data records request 172 to a data owner system that is requesting one or more data records. Note in an example, the temporary vault may already store shareable data records before the data consumer computing entity sends the compute code 170. In an example, the compute code is implemented by a container run in Kubernetes. The compute code may include one or more of query parameters, an analysis function, credentials, and an output storage location.

As illustrated, multiple data consumer computing entities 12 may collaborate to generate compute code 170 for a temporary vault 65. For example, data consumer computing entities #2 and #3 both send compute code 170 to temporary vault #2. For example, data consumer computing entities #2 and #3 have related queries (e.g., queries that overlap in results and/or are a dependent query (e.g., need a result from a first query for processing and producing a second query result). Thus, data consumer computing entities #2 and #3 may determine who is responsible for providing compute code to the temporary vault to facilitate processing the request. For example, data consumer computing entity #2 determine to produce a first portion of compute code (e.g., container information, query information, and a first analysis function) for the queries of temporary vault #2 and data consumer computing entity #3 determines to produce a second portion (e.g., a second analysis function) of the compute code.

In an example, the data consumer computing device may generate the compute code by purchasing a generic compute code (e.g., container information) and adding specific compute code (e.g., query parameters) to the generic compute code. In another example, the data consumer computing device utilizes previously generated compute code as the compute code (e.g., when running a similar query). As yet another example, the data consumer computing device modifies previously generated compute code and adds purchased compute code to produce the compute code.

Figure 6C:
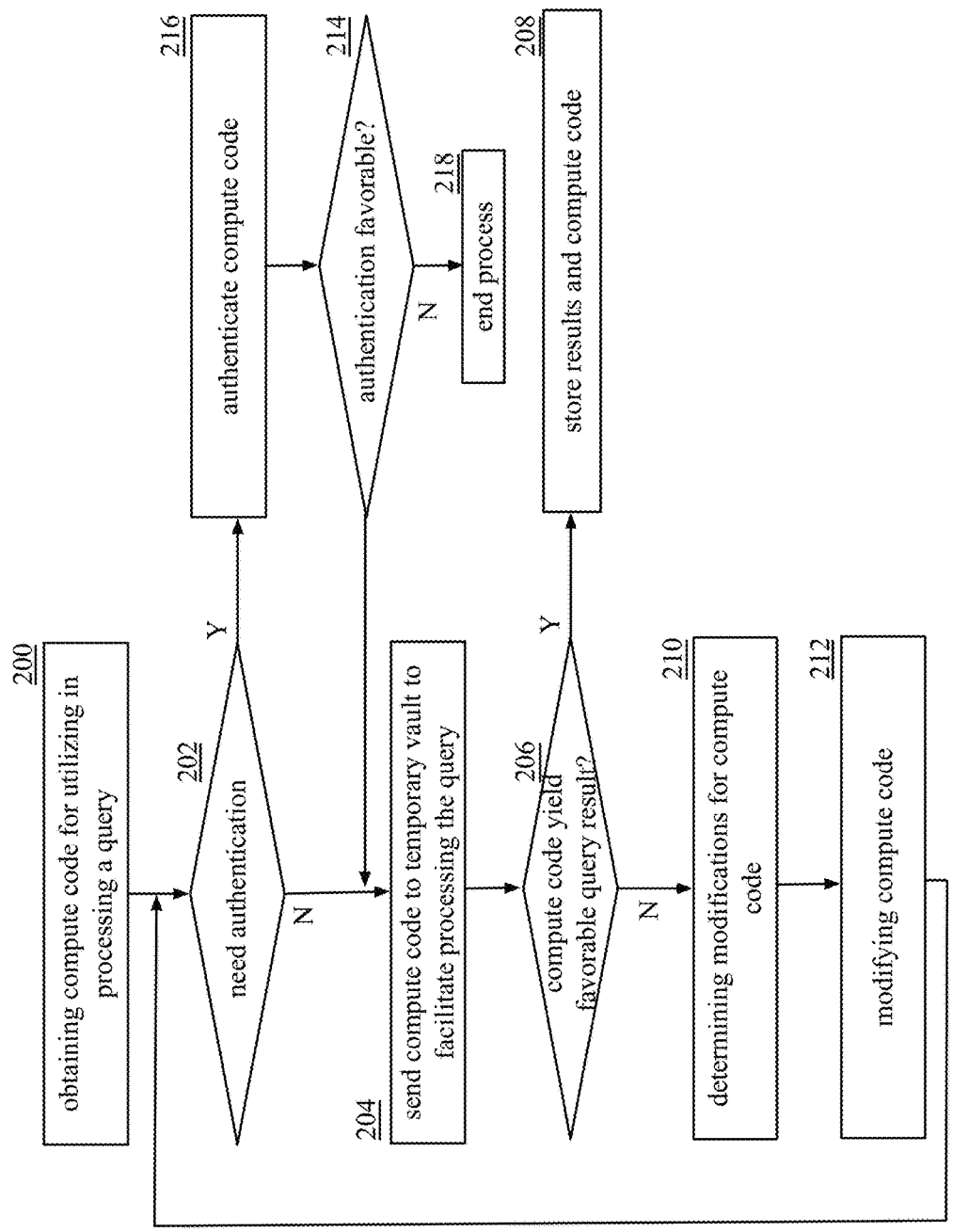
FIG. 6C is a flowchart of an example of a method of utilizing compute code to facilitate processing a query in a vault in accordance with the present invention.

FIG. 6C is a flowchart of an example of a method of utilizing compute code to facilitate processing a query in a vault. The method begins or continues with step 200, where a data consumer computing entity obtains (e.g., generates, receives (e.g., purchases)) compute code for utilizing in processing a query. The method continues with step 202, where the data consumer computing entity determines whether the compute code needs authentication. For example, the data consumer computing entity receives a message from a data processing system that indicates compute code must be authenticated for use in a temporary vault. In an example, security and reliability of the query process is increased by authenticating a compute code. The authenticating may include one or more of verifying accuracy with a programming language, debugging the compute code, verifying compliance with a temporary credential protocol, and verifying a data consumer associated with the compute code is not a malicious actor.

When the compute code needs authentication, the method continues with step 216, where the data consumer computing entity facilitates authentication the compute code. In one example, the data consumer computing entity sends the compute code to a third party authenticating device that is authorized by the data processing system to authenticate. In another example, the data processing system authenticates the compute code. In yet another example, the data consumer computing device runs the authentication process and produce logs regarding the authentication that are sent to one or more of data owners associated with a query in the compute code, an output storage bucket and the data processing system.

When the authentication is not favorable (e.g., compute code is not authenticated successfully), the method continues to step 218, where the process ends. Alternatively, another authentication process may be performed. For example, when the data consumer computing entity performs the unsuccessful authentication, the data consumer computing entity sends the computing code and the log of the unsuccessful authentication to the data processing system. The data processing system then performs an authentication process on the compute code and logs. When the authentication is favorable (e.g., compute code is successfully authenticated), the method continues to step 204.

When the compute code does not need authentication, the method also continues to step 204, where the data consumer computing entity sends the compute code to a temporary vault to facilitate processing the query. The method continues with step 206, where the data consumer computing entity determines whether the compute code yielded a favorable query result. For example, the data consumer computing entity determines whether a margin of error for the query result is below an error threshold. When the compute code yielded a favorable query result (e.g., margin of error less than an error threshold), the method continues to step 208, where the data consumer computing entity stores the query result and compute code. In one instance, the data consumer computing entity sends the result and compute code to the data processing system.

When the compute code did not yield a favorable query result (e.g., margin of error greater than an error threshold), the method continues with step 210, where the data consumer computing entity determines modifications for the compute code. For example, the data consumer computing device determines that a number of data records should be increased and modifies query parameters of the compute code accordingly in step 212. As another example, the data consumer computing device determines another data owner type should be included in the query and modifies the query parameters of the compute code accordingly in step 212. Having modified the compute code, the method continues back to step 202, where the consumer computing device determines whether the modified compute code needs to be authenticated.

In one example, when the modification is of a first type (e.g., changing a query parameter), the modified compute code does not need to be re-authenticated. In another example, when the modification is of a second type (e.g., adding a credential), the modified compute code needs to be re-authenticated.

Figure 7A:
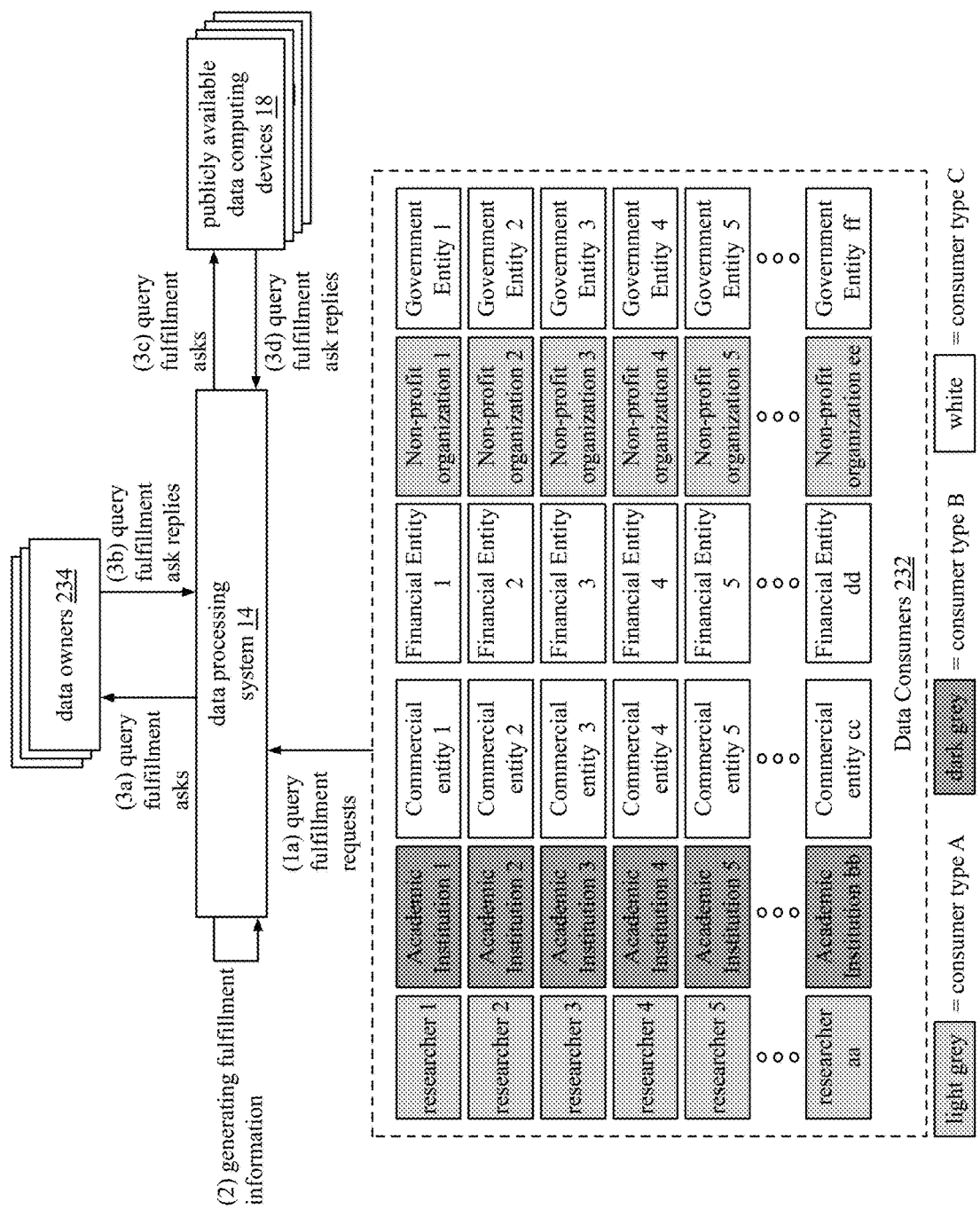
FIGS. 7A-7B are schematic block diagram of an embodiment of query optimization in a data communication network in accordance with the present invention.

FIG. 7A is a schematic block diagram of an embodiment of query optimization in a data communication network that includes data owners 234, a data processing system 14, publicly available data computing devices 18 and a plurality of data consumers 232. In an example, a data owner is implemented by one or more data owner systems 16 of FIG. 1. In another example, a data consumer 232 is implemented by one or more data consumer computing entities 12 of FIG. 1. In an example, data owners wish to share data with one consumer type (e.g., government entity), but not with another consumer type (e.g., academic institution). Thus, the data processing system may assign various consumer types to the data consumers 232. For example, a researcher may be a first consumer type, an academic institution may be a second consumer type, and a government entity may be a third consumer type.

In an example of operation, the data processing system 14 receives query fulfillment requests from a multitude of data consumers 232. For example, during a first time period (e.g., 5 minutes) the data processing system receives 1500 query fulfillment requests from 845 different data consumers. The data processing system determines, for the pending fulfillment requests, fulfillment information. The fulfillment information includes one or more of who is asking (e.g., what consumer type), what are the consumers asking for (e.g., what data records, what data fields, what functions are to be executed, etc.) what data owners have registered and are available to share data, what data has already been and/or is currently being shared, and what potential data owners may be queried among other determinations for processing the query fulfillment requests.

The data processing system 14 then sends, based on the fulfillment information, query fulfillment asks to data owners 234 and publicly available data computing devices 18 for data records that may be of interest in fulfilling the pending queries. The data processing system 14 receives query fulfillment ask replies from the data owners 234 and the publicly available data computing device 18. For example, the publicly available data computing device 18 query fulfillment ask reply includes an indication it has 1850 data records that may be of interest in fulfilling the queries and the data owners query fulfillment ask reply includes an indication that they have 25,026 data records that may be of interest in fulfilling the queries.

Figure 7B:
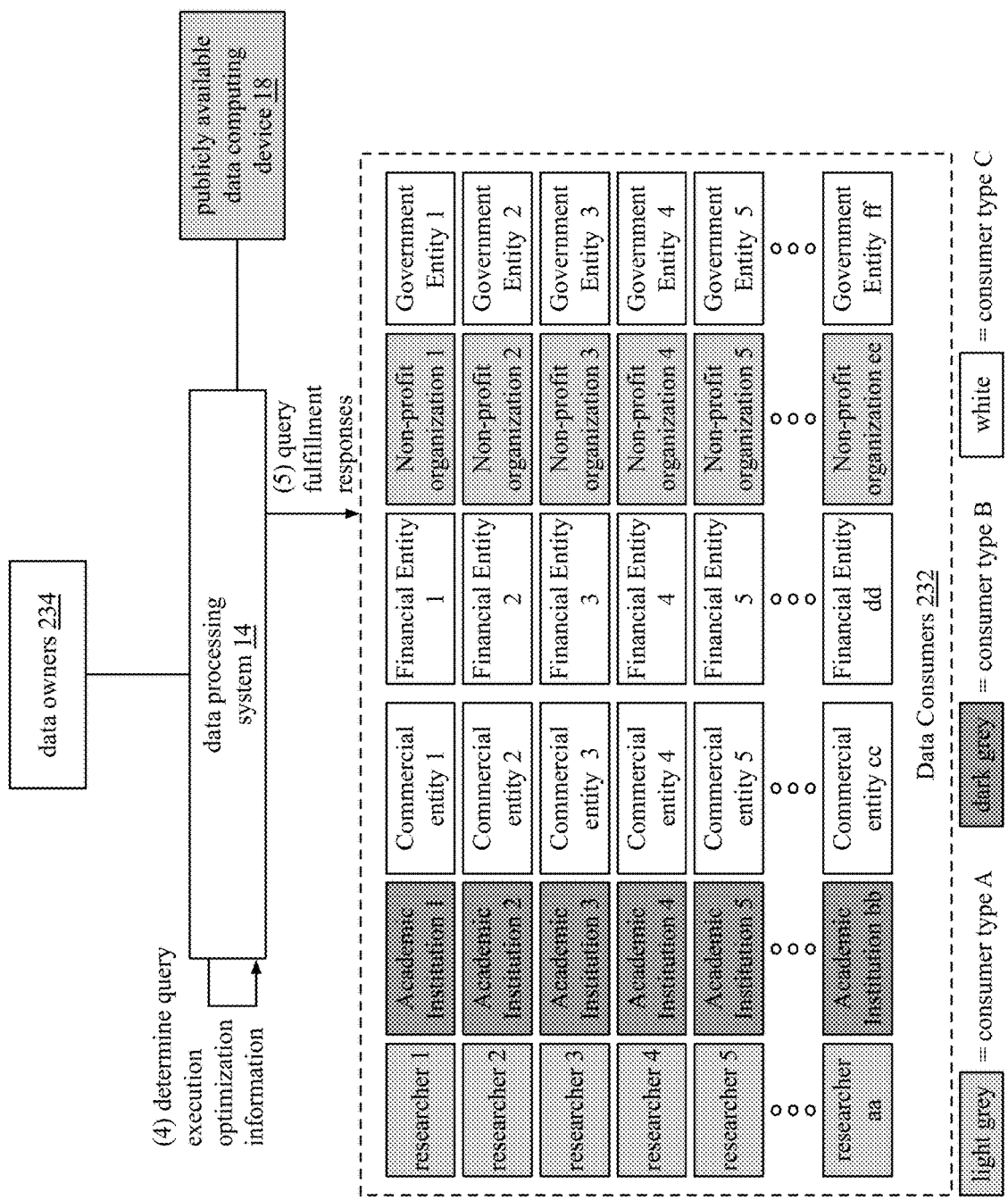

FIG. 7B continues with the example where the data processing system determines, based on the query fulfillment ask replies and query fulfillment ask requests, execution optimization information (4) that includes one or more optimizations for returning results for the pending queries. The query execution optimization information includes one or more of a query order (scheduling (e.g., order of a query queue, when to finish query, when to start query, option to schedule at a particular time for a reduced fee, etc.), identity of a temporary vault for processing a query, identity of output storage locations for sending a query result and/or compute code, information on shareable data already populated in a temporary vault, and identities of data owners to access from the temporary vault to gather shareable data. In essence, the query execution optimization information allows for the queries to be fulfilled in one or more of a reduced amount of time, utilizing a reduced amount of data, in a reduced amount of data accesses, and with a reduced amount of total processing resources consumed. In an example, the data processing system may send out scheduling request to the data consumers to determine, based on scheduling replies from the data consumers, the query queue order.

Having determined the query execution optimization information, the data processing system generates and sends query fulfillment responses (5) to the data consumers 234. The query fulfillment responses may include one or more of the query execution optimization information, credentials, option to share temporary vault with another data consumer, billing information and a pre-payment request.

Figure 7C:
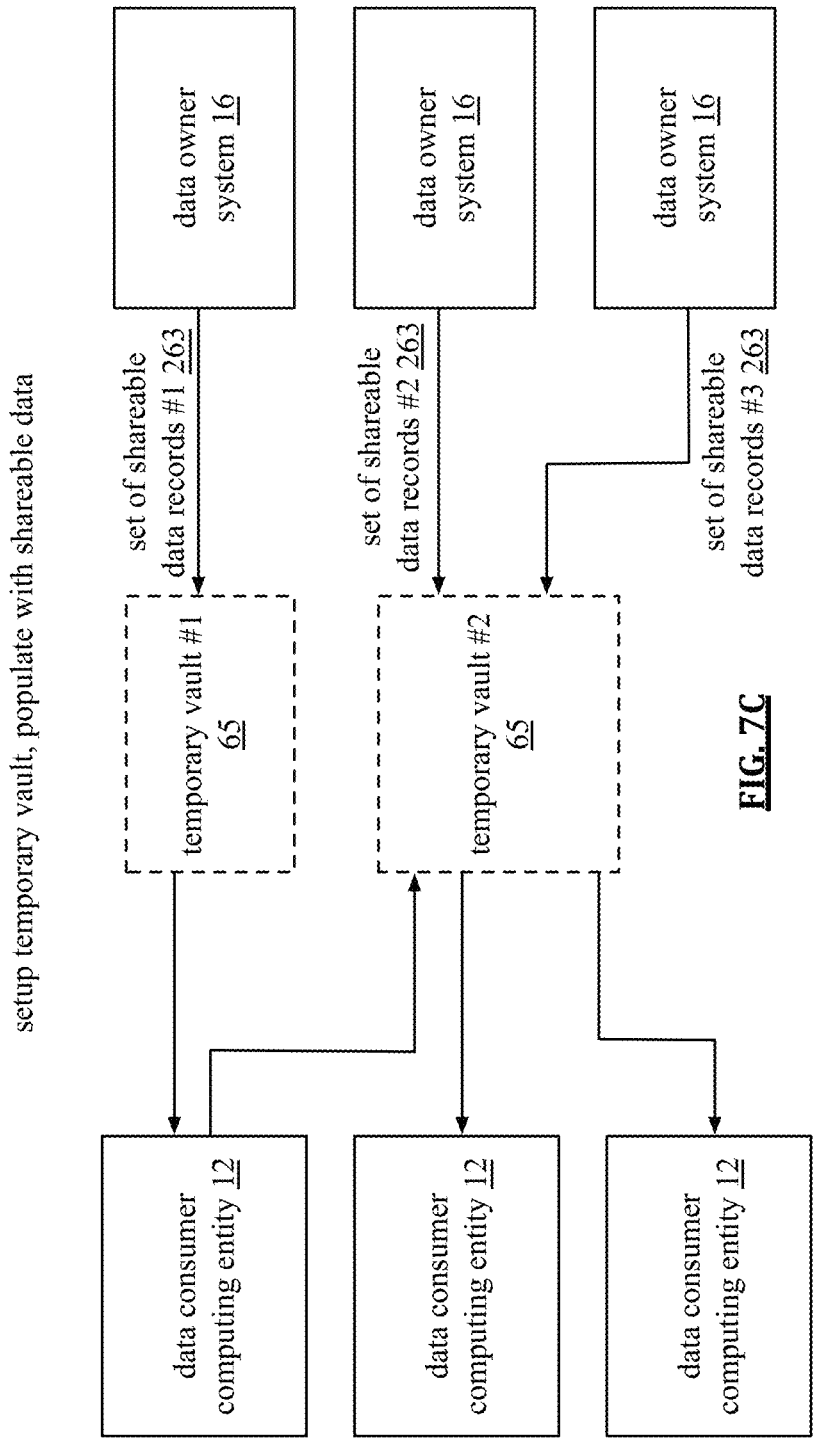
FIG. 7C is a schematic block diagram of an example of processing a set of the queries in accordance with the present invention.

FIG. 7C is a schematic block diagram of an example of processing a set (e.g., at least some) of the queries of FIGS.

7A-B by a plurality of data consumer computing entities 12 (e.g., of data consumers 232), temporary vaults 65, and a plurality of data owner systems 16 (e.g., of data owners 234). In an example, the temporary vaults are setup in accordance with the query execution optimization information (e.g., are spun up at a scheduled time).

Continuing with the example of FIGS. 7A-B, the data consumer computing entities interact with temporary vaults to mine sets of shareable data records 263 from the data owner systems and store them in the temporary vaults. The interaction may further include mining and executing a data analysis function on a set of shareable data records in accordance with the query execution optimization information (e.g., mined and executed in a particular order), which will be discussed in further detail with reference to one or more subsequent Figures. For example, when a second query on a second set of shareable data records is dependent on results from a first query on a first set of shareable data records, the first query is processed before the second query. As a specific example, query B needs to be run on the set of shareable data records #2 in temporary vault #2 65 before query result A. Thus, query B result is dependent on query result A.

Figure 7D:
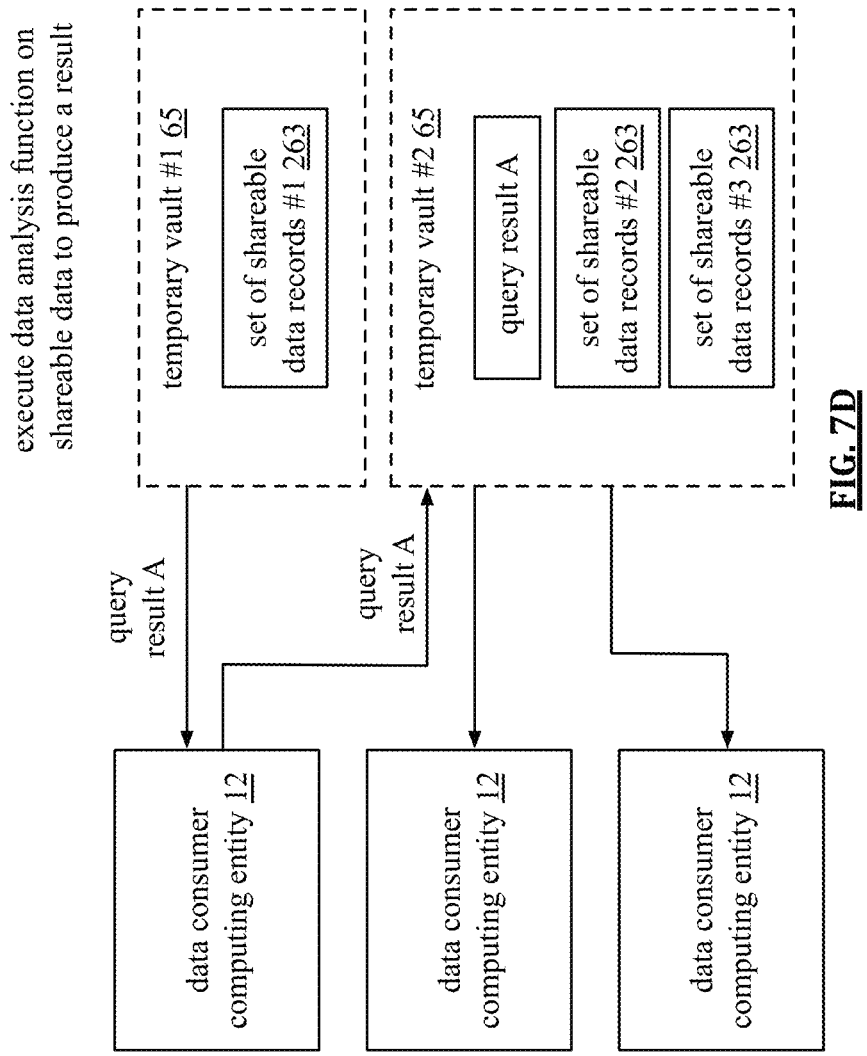
FIG. 7D is a schematic block diagram of an example of processing queries in accordance with query execution optimization information in accordance with the present invention.

FIG. 7D is a schematic block diagram of an example of processing queries in accordance with query execution optimization information that indicates a result for query A should be produced before executing an analysis function on a second set of shareable data records associated with query B. As such, an analysis function is executed on a first set of shareable data records 263 associated with query A to produce query result A. Query result A is then sent to temporary vault #2 65 so that query B can be completed.

Figure 7E:
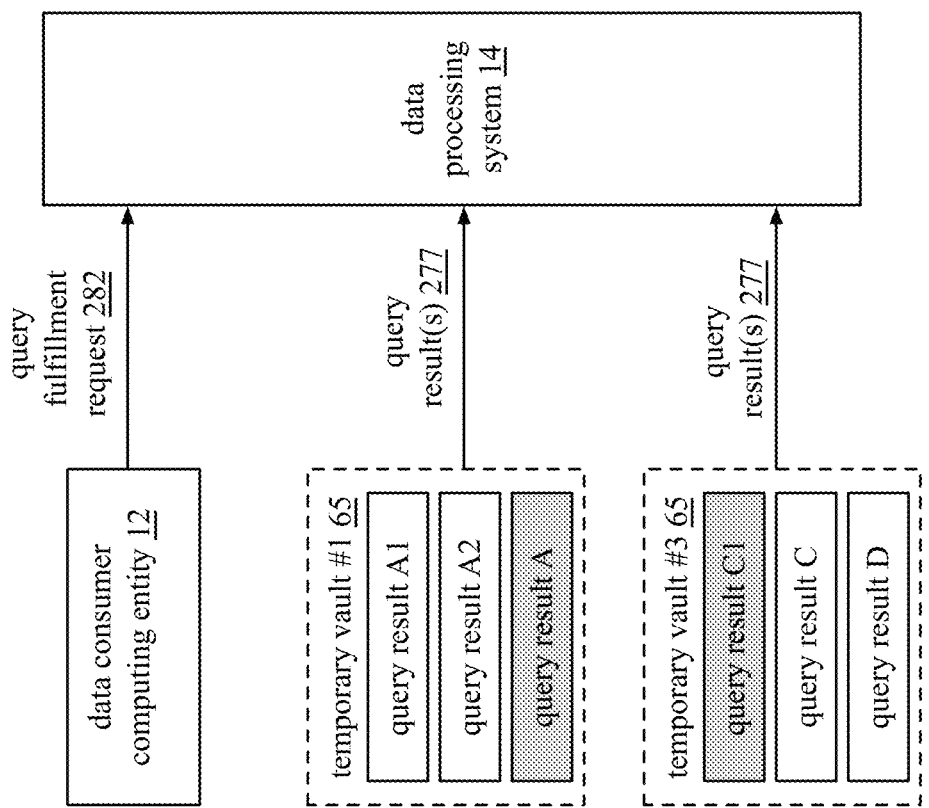
FIG. 7E is a schematic block diagram of an embodiment of a data processing system in accordance with the present invention.

FIG. 7E is a schematic block diagram of an embodiment of a data processing system 14 receiving query fulfillment requests 282 and query results 277 from previous pending query requests (e.g., query A). The data processing system 14 further operates to utilize the query results to determine an execution order (e.g., of the query execution optimization information) for processing the pending queries. In one example, the query result is a message indicate a result for a query is stored in an output storage bucket. In another example, the query result includes the analytical result for the query.

Figure 7F:
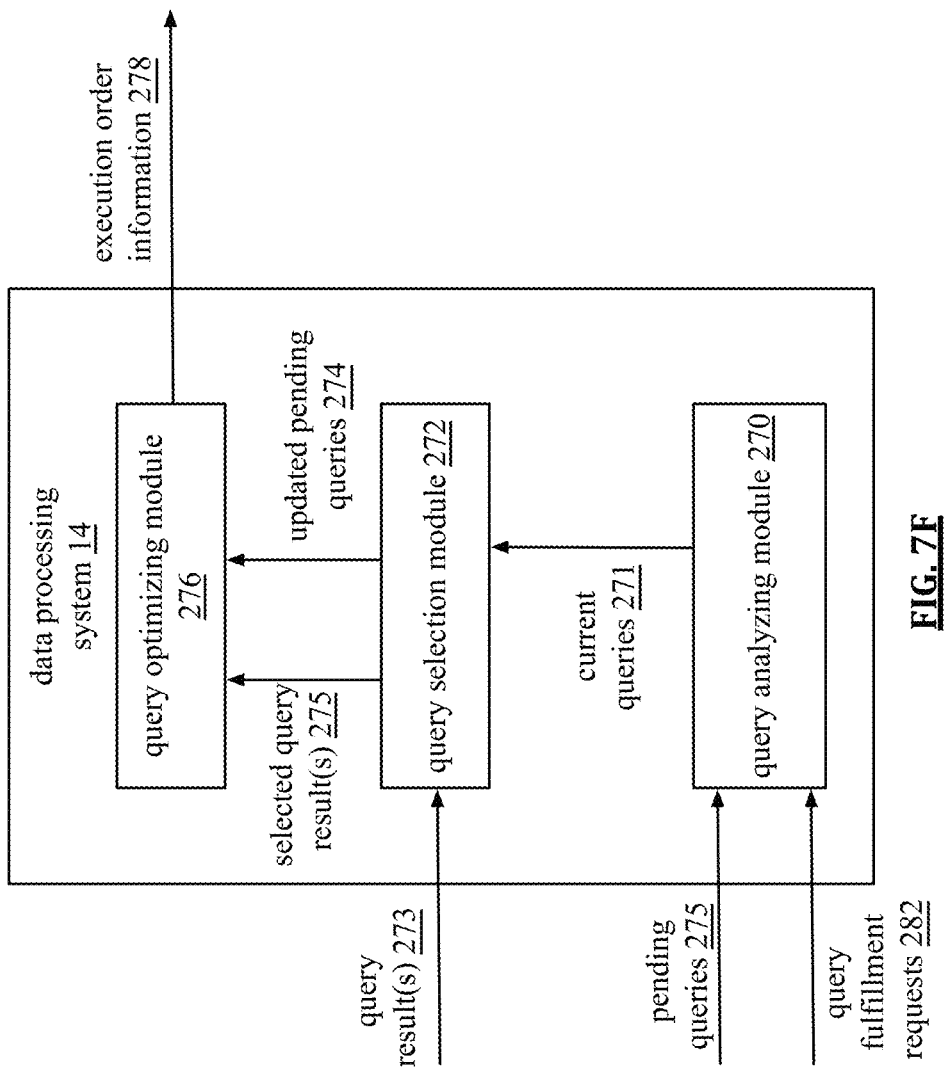
FIG. 7F is a schematic block diagram of an embodiment of a data processing system in accordance with the present invention.

FIG. 7F is a schematic block diagram of an embodiment of a data processing system 14 generating execution order information 278 (e.g., for query execution optimization information) based on query results 273, pending queries 275 and query fulfillment requests 282. The data processing system 14 includes a query analyzing module 270, a query selection module 272, and a query optimization module 276.

In an example of operation, the query analyzing module 270 receives pending queries 275 and query fulfillment requests 282. In an example, pending queries 275 are previous query requests that have not been completed. The query analyzing module performs one or more of grouping like requests and combining pending queries with the query requests to produce a current queries list 271.

The query selection module 272 produces selected query results 275 and updated queries 274 based on query results 273 and current queries 271. As an example, query selection module 272 removes a first query from the current queries list 271 when it receives a query result 273 associated with the first query. As another example, query selection module 272 adds query results 273 that may be utilized in facilitating completion of an updated pending query to a selected query result list 275.

The query optimizing module generates execution order information 278 based on the selected query results 275 and the updated pending queries 274. In an example, the execution order information includes an execution order (e.g., a queue) for the updated pending queries and the selected query results (e.g., the analytical result or a storage location to retrieve the query result from). The execution order information may further include grouping related queries (e.g., within a range of queries in the queue, in a consecutive number of queries in the queue).

Figure 7G:
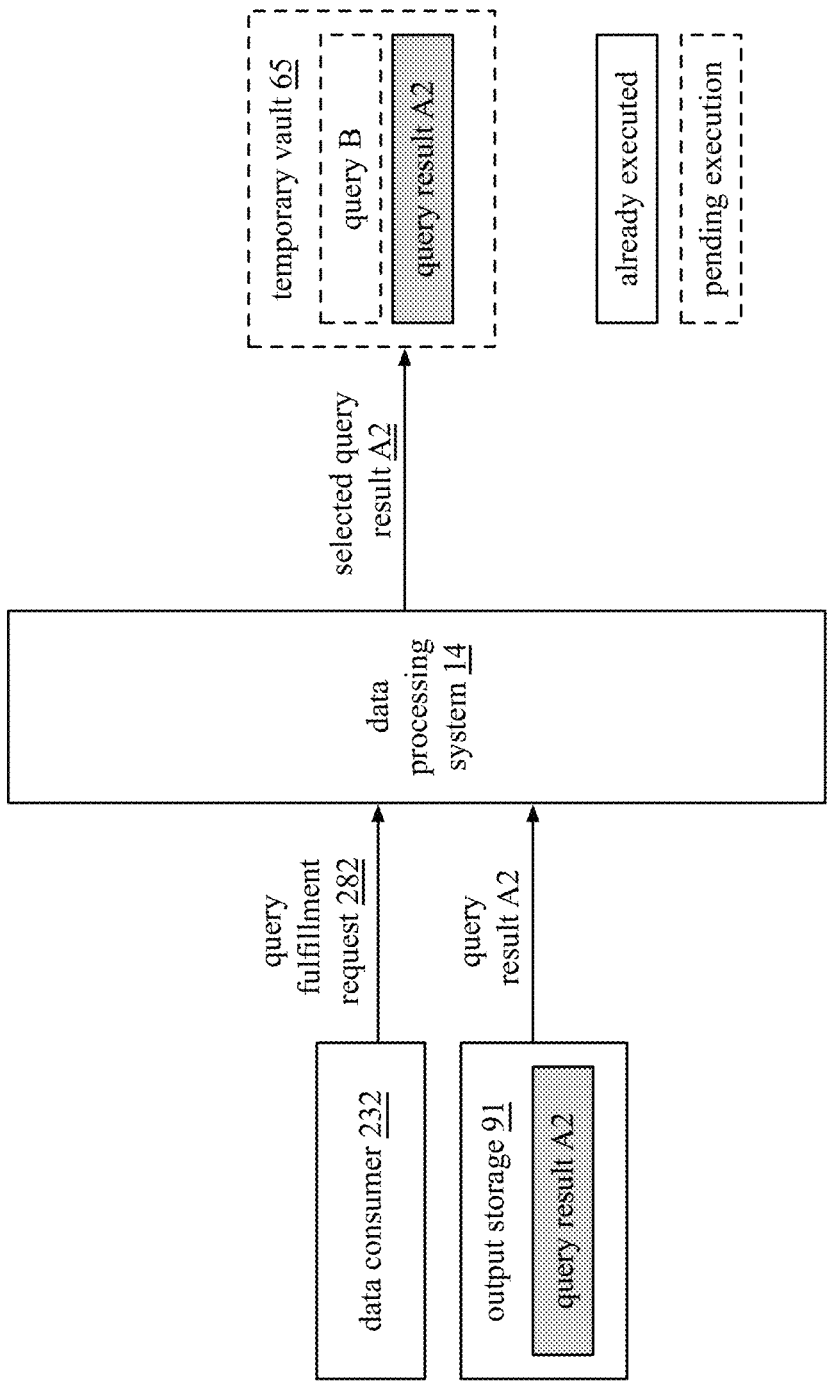
FIG. 7G is a schematic block diagram of an embodiment of a data processing system in accordance with the present invention.
Figure 7I:
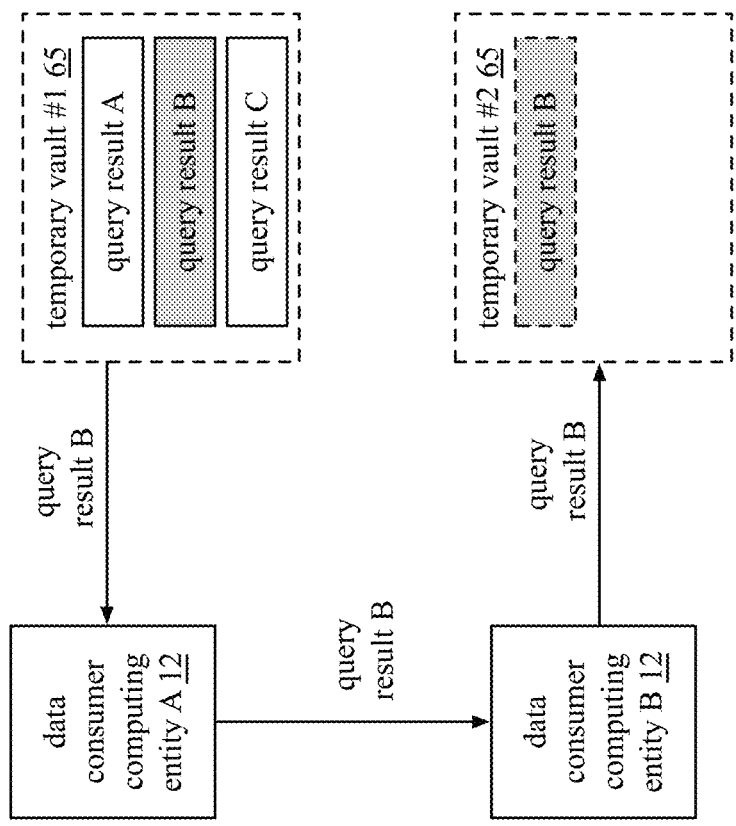
FIG. 7I is a schematic block diagram of another example of exchanging query results in accordance with the present invention.

FIG. 7G is a schematic block diagram of an embodiment of a data processing system facilitating processing a query in accordance with execution optimization information. In this example, the data processing system 14 receives query result A2 and query fulfillment request 282 that includes a query B, which is dependent on query result A2. As a specific example, query result A2 includes a number of people that have arrived in state A in the last 3 day and query B is determining the percentage of people that arrived in state A in the last 3 days that have tested positive for a particular human coronavirus. However, the set of shareable data records related to query B include all the positive tests for people arriving in state A in the last 3 days. Thus, to complete query B, the result for query A2 (e.g., the total number of people that arrived in state A in the last 3 days) is needed to calculate the percentage. Thus, the data processing system provides the query result A2 to the temporary vault 65. An analysis function is executed on the set of shareable data records related to query B and query result A2 to produce query result B.

Figure 7H:
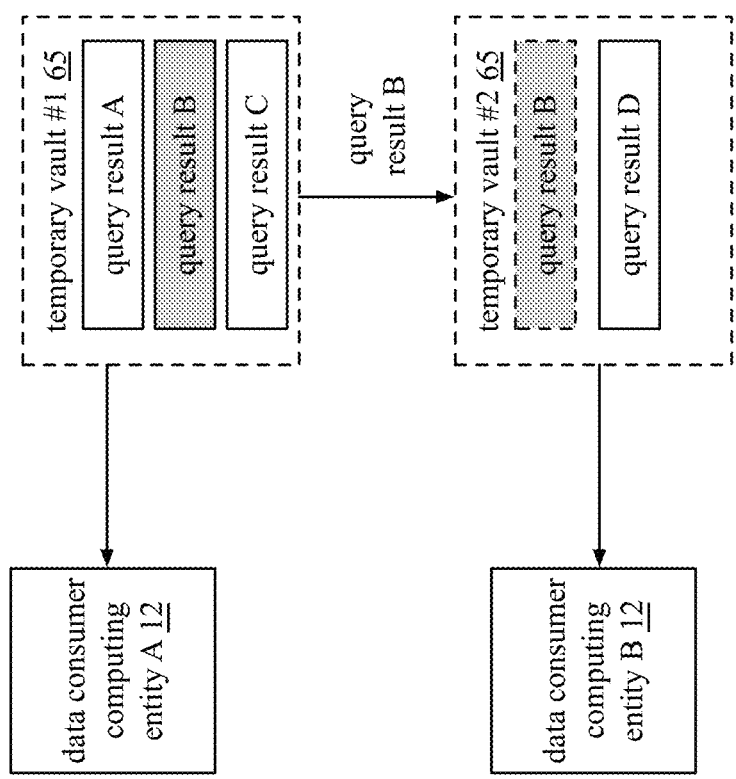
FIG. 7H is a schematic block diagram of an example of exchanging query results in accordance with the present invention.
Figure 7I:
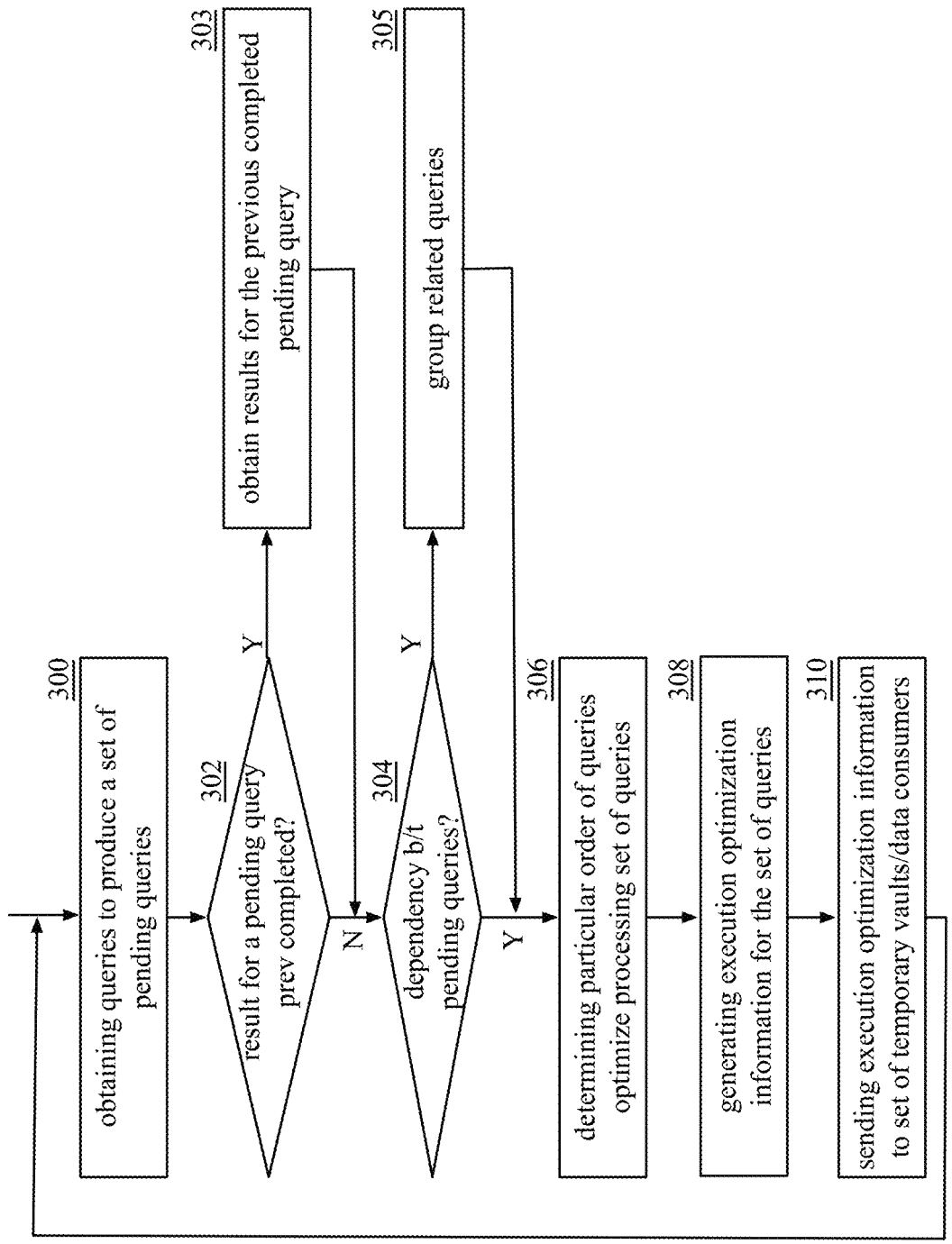

FIG. 7H is a schematic block diagram of an example of exchanging query results in accordance with query execution optimization information by sending a query result (e.g., query result B) directly from a first temporary vault to a second temporary vault.

FIG. 1 is a schematic block diagram of another example of exchanging query results in accordance with query execution optimization information by sending a query result (e.g., query result B) from a first temporary vault to a second temporary vault via a first data consumer computing device and a second data user computing device.

FIG. 7J is a flowchart of an example of a method of facilitating processing of ordering queries in a data communication network. The method begins or continues with step 300, where a data processing system of the data communication network obtains a set of pending queries. The method continues with step 302, where the data processing system determines whether there are any results for a pending query previously completed. In one example, the data processing system also scans the pending queries to determine, for a first pending query, whether a result from a second pending query would fulfill the first pending query (e.g., the first and second pending queries are substantially the same).

When there are results available, the method continues to step 303, where the data processing system obtains results for the previously completed pending query. For example, the data processing system retrieves a result from an output storage location that stores query results and metadata regarding the corresponding queries (e.g., query parameters, function executed on shareable data set, etc.). As another example, the data processing system schedules retrieval of result (e.g., when another pending query is substantially the same) to correspond with another pending query that will yield the result. The method then continues to step 304.

When there are no results available, the method continues with step 304, where the data processing system determines whether there is a dependency between two or more pending queries of the set of pending queries. For example, the data processing system determines data results for a first query that are necessary or otherwise can be utilized in fulfilling a second query to produce a second result. When there is dependency between pending queries (e.g., queries are related such that a result from one query can be used in another query without a separate additional process for accessing a shareable data set and executing a function on the shareable data set to produce the result), grouping by the data processing system, the related queries to produce one or more pending query groups. For example, a first pending group includes query A, query B and query C, where query C needs results from queries A and B and a second pending group includes query D, query E and query F, where query D needs a result from query E and query E needs a result from query F. By determining and grouping related queries, the amount of data retrieved and the number of functions executed on shareable data sets can be reduced.

The method continues with step 306, where the data processing system determines a particular order of queries that will optimize processing set of queries. For example, the data processing system determines timeframes in which pending queries need to be completed. As another example, the data processing system determines the particular order based on dependency of a pending query group. As a specific example, the data processing system determines that query B needs to run before query A, and not query C, thus orders queries in the first query group: query B, query A, query C. As another example, the data processing system determines query C needs to run before query B and not query A, thus orders queries in the first query group: query A, query C, query B. Note that since query C needs a result from query B and needs to run first, the dependency of queries B and C may be flipped (e.g., query C result can be used in processing query B.

The method continues with step 308, where the data processing system generate execution optimization information (EOI) for the set of pending queries. The EOI includes a pending query schedule (timeframe for producing a query result), pending query identifiers, temporary vault identifiers, data consumer computing device identifiers, and temporary credentials that allow results from one temporary vault to be sent to another temporary vault (e.g., directly (utilizing a temporary vault ID), via the data processing system, and/or via one or more data consumer computing devices (e.g., utilizing a data consumer computing device ID, etc.).

The method continues with step 310, where the data consumer computing device sends execution optimization information to a set of temporary vaults and/or data consumer computing devices. The method then continues back to step 300.

Note a computer readable storage device or medium stores operational instructions, that when executed by a computing device of the data processing system, causes the computing device to perform one or more functions and/or steps associated with the preceding figures.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to a magnitude of differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:

obtaining, by a consumer computing device, a temporary credential in accordance with a temporary credential protocol;

accessing, by the consumer computing device, a temporary vault in accordance with the temporary credential, wherein the temporary vault stores or is to store a set of shareable data records;

facilitating, by the consumer computing device, execution of a data analysis function on the set of shareable data records to produce an analytical result, wherein the facilitating the execution includes:

sending the data analysis function to a verification computing device;

receiving a verification response from the verification computing device; and when the verification response is favorable, sending, the data analysis function to the temporary vault;

receiving, by the consumer computing device from the temporary vault, the analytical result; and storing, by the consumer computing device, the analytical result in memory associated with the user computing device.

2. The method of claim 1, wherein generating a shareable data record of the set of shareable records comprises:

modifying, by a data owner computing device, at least one data field of a data record associated with the data owner to produce the shareable data record such that an identity associated with the data record is substantially unknowable; and facilitating, by the data owner computing device, temporary storage of the shareable data record in the temporary vault.

3. The method of claim 1 further comprises:

sending, by the consumer computing device, a data query access request to a data processing system; and receiving, by the consumer computing device from the data processing system, a data query access response that includes the temporary credential.

4. The method of claim 3, wherein the data query access response further includes one or more of:

identity of the temporary vault;

information regarding the temporary credential protocol; and query billing information.

5. The method of claim 1 further comprises:

sharing, in accordance with an agreement between an entity associated with the user computing device and a data owner associated with the set of shareable data records, the analytical result with one or more third party computing entities.

6. The method of claim 1 further comprises:

sending, by the consumer computing device, a query status message to a data owner associated with the temporary credential; and when the query status message indicates a final query for the temporary vault is complete, destroying the temporary credential, the temporary vault and its contents.

7. The method of claim 1 further comprises:

sending, by the consumer computing device, a registration request to a data processing system that includes a type of user associated with the consumer computing device.

8. The method of claim 7, wherein the type includes one or more of:

a research entity;

a commercial entity;

a non-profit entity;

a financial entity; and an academic entity.

9. The method of claim 1 further comprises:

determining whether to facilitate execution of a second analysis function on the set of shareable data records to produce a second analytical result; and when determining to facilitate:

facilitating, by the consumer computing device, execution of the second data analysis function on the set of shareable data records to produce the second analytical result.

10. The method of claim 9 further comprises:

when determining not to facilitate:

determining, whether to modify the set of shareable data records; and when determining to modify, adding at least one additional shareable data record to the set of shareable data records to produce an updated set of shareable data records.

11. The method of claim 10 further comprises:

determining whether to facilitate execution of the second analysis function on the updated set of shareable data records; and when determining to facilitate:

facilitating, by the consumer computing device, execution of the second data analysis function on the updated set of shareable data records to produce the second analytical result.

12. The method of claim 1 further comprises:

obtaining, by the consumer computing device, a second credential, wherein the second credential facilitates access to data records of a data owner system from the temporary vault.

13. The method of claim 1 further comprises:

sending, by the consumer computing device to a data processing system, a query fulfillment request that includes a set of query parameters;

receiving, by the consumer computing device from the data processing system, a query fulfillment response, wherein the query fulfillment response includes one or more query parameter modifications associated with one or more query parameters of the set of query parameters that have an issue; and determining, by the consumer computing device, whether the one or more query parameter modifications allow the query fulfillment request to be favorably completed; and when favorable:

generating, by the consumer computing device, an updated query fulfillment request that includes an updated set of query parameters based on the one or more query parameter modifications; and sending, by the consumer computing device, the updated query fulfillment request to the data processing system.

14. The method of claim 13 further comprises:

when the one or more query parameter modifications do not allow the query fulfillment request to be favorably completed:

determining, by the consumer computing device, whether a second one or more query parameter modifications allow the query fulfillment request to be favorably completed in accordance with the query status information; and when the second one or more query parameters are favorable:

generating a second updated query fulfillment request that includes a updated second set of query parameters based on the query status information; and sending, by the consumer computing device, the second updated query fulfillment request to the data processing system.

15. The method of claim 13, wherein a query parameter of the set of query parameters include:

the data analysis function;
a threshold number of data records needed for the query;
a data type;
a data format;
a data size;
a data owner type;
a time period;
a specific data field of a data record; and
a correlation between two data fields of one or more data records.

* * * * *